US012444343B2

(12) United States Patent
Wong

(10) Patent No.: US 12,444,343 B2
(45) Date of Patent: Oct. 14, 2025

(54) LED DRIVER CIRCUIT, MULTI-WIRE COMMUNICATION DEVICE AND METHOD FOR LED DISPLAY SYSTEM

(71) Applicant: Joulwatt Technology Co., Ltd., Hangzhou (CN)

(72) Inventor: Pitleong Wong, Hangzhou (CN)

(73) Assignee: JOULWATT TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/081,307

(22) Filed: Dec. 14, 2022

(65) Prior Publication Data

US 2023/0282156 A1 Sep. 7, 2023

(30) Foreign Application Priority Data

Dec. 14, 2021 (CN) ......................... 202111530937.6

(51) Int. Cl.

*G09G 5/12* (2006.01)
*G09G 3/32* (2016.01)
*G09G 3/34* (2006.01)
*G09G 3/36* (2006.01)
*H04L 45/74* (2022.01)

(52) U.S. Cl.

CPC ............. *G09G 3/32* (2013.01); *G09G 3/3406* (2013.01); *G09G 3/36* (2013.01); *G09G 2320/0626* (2013.01); *G09G 2370/10* (2013.01); *H04L 45/74* (2013.01)

(58) Field of Classification Search

None

See application file for complete search history.

(56) References Cited

U.S. PATENT DOCUMENTS

2009/0085861 A1* 4/2009 Lee ........................ G09G 3/342 345/102
2011/0248974 A1* 10/2011 Murai .................. G09G 3/3426 345/207
2015/0346887 A1* 12/2015 Cho ..................... G06F 3/04166 345/174
2020/0257399 A1* 8/2020 Guo ...................... G06F 3/0416
2021/0366391 A1* 11/2021 Wei ....................... G09G 3/3208
2022/0020310 A1* 1/2022 Gray ........................ G09G 3/32

* cited by examiner

*Primary Examiner* — Lunyi Lao
*Assistant Examiner* — Donna V Bocar
(74) *Attorney, Agent, or Firm* — Treasure IP Group, LLC

(57) ABSTRACT

Disclosed is an LED driver circuit, a multi-wire communication device and a method for an LED display system. The device comprises a controller providing at least one of a configuration data packet, a brightness data packet, and a display data packet; the LED driver circuits, wherein the LED driver circuits are cascaded to provide a first data channel using first data ports and second data ports, the LED driver circuits are connected in parallel to provide a second data channel using third data ports. The device relays an enable signal or an address data packet stage by stage using the first data channel, transmit at least one of the configuration data packet, the brightness data packet and the display data packet in parallel using the second data channel. The number of the cascaded LED driver circuits can be infinite, the number of data wires is reduced, data rate is increased.

18 Claims, 18 Drawing Sheets

LED DRIVER CIRCUIT, MULTI-WIRE COMMUNICATION DEVICE AND METHOD FOR LED DISPLAY SYSTEM

CROSS-REFERENCE TO RELATED APPLICATION

This application claims priority to Chinese patent application No. 202111530937.6, filed on Dec. 14, 2021, published as CN115148146A on Oct. 4, 2022, and entitled “LED DRIVER CIRCUIT, MULTI-WIRE COMMUNICATION DEVICE AND METHOD FOR LED DISPLAY SYSTEM”, the entire content of which is incorporated by reference in its entirety.

FIELD OF THE DISCLOSURE

The present disclosure relates to a technical field of electronic circuits, and more particularly to an LED driver circuit, a multi-wire communication device and a method for an LED display system.

DESCRIPTION OF THE RELATED ART

LEDs, serving as self-luminous elements, are widely used in display systems. In an LED display screen, an LED is used as a pixel unit to realize image display. In a liquid crystal display (LCD) screen, an LED can serve as light source for providing backlight. With the improvement of display quality, the number of LEDs used in a display system is gradually increased, whether the LEDs are used as pixel units or light sources.

In a liquid crystal display screen, liquid crystal molecules themselves do not emit light, an LED array in a backlight module (BLU) forms an area light source to provide backlight with sufficient brightness and uniform distribution. Display quality of the LCD screen is affected by luminous effect and color gamut range of the backlight module. With an increasing market demand for high-quality display screens, multi-partition direct-down mini-LED backlight technology has been developed to realize LCD screens with high brightness, high color gamut, high contrast and low power consumption.

The number of LEDs used in a backlight module may be as much as tens of thousands, even close to a hundred thousand. During patch production and usage of a product, poor LED devices may lead to high failure rate. Therefore, in the backlight module, not only a first data channel for distributing configuration and brightness information should be provided to adjust partition dimming, but also a second data channel for perform data read-back should be provided, so as to quickly determine a cause of a problem. The first and second data channels can be used to detect a defect of LEDs during patch production, and to improve a yield of backlight of finished products through rapid positioning and repairing in the production stage.

A general serial communication bus, such as an I2C bus or an SPI bus, can be used for implementing the first and second data channels, however, in applications of display systems, the general serial communication bus has limitations. For example, the I2C bus including two lines (i.e., a clock line and a data line) has a problem that address should be pre-allocated and wiring is complicated. The SPI bus including four lines has an advantage of fast data rate. However, based on a daisy chain structure, relaying stage-by-stage affects communication efficiency, or under multidrop communication, it is required that multiple chip selection signals should be provided, which leads to higher wiring cost.

Therefore, in the backlight module, meeting requirements on configuring a large number of driver chips with high speed by use of a general serial communication bus may become more and more difficult.

SUMMARY OF THE DISCLOSURE

In view of this, an objective of the present disclosure is to provide an LED driver circuit, a multi-wire communication device and a multi-wire communication method for an LED display system.

According to a first aspect of the present disclosure, a multi-wire communication device for an LED display system is provided, and comprises: a controller, configured to provide at least one of a configuration data packet, a brightness data packet and a display data packet; and a plurality of LED driver circuits, each of which comprises a first circuit data port, a second circuit data port and a third circuit data port, wherein, by use of the first circuit data ports and the second circuit data ports of the LED driver circuits, the plurality of LED driver circuits are cascaded to provide a first data channel, and by use of the third circuit data ports of the LED driver circuits, the plurality of LED driver circuits are connected in parallel to provide a second data channel, the multi-wire communication device is configured to relay an enable signal or an address data packet by use of the first data channel, and transmit at least one of the configuration data packet, the brightness data packet and the display data packet in parallel by use of the second data channel.

In some embodiments, the controller comprises a first controller data port and a second controller data port, the plurality of LED driver circuits comprise a first-stage LED driver circuit and a last-stage LED driver circuit, and the first circuit data port of the first-stage LED driver circuit is connected to the first controller data port of the controller, and the third circuit data ports of the plurality of LED driver circuits are connected in parallel to the second controller data port of the controller.

In some embodiments, the second circuit data port of the last-stage LED driver circuit is connected to a constant voltage level.

In some embodiments, the constant voltage level is a voltage level at a power supply terminal or a ground terminal of the multi-wire communication device.

In some embodiments, the second circuit data port of the last-stage LED driver circuit is connected to the second controller data port of the controller.

In some embodiments, the plurality of LED driver circuits are configured to initiate address allocation based on a trigger signal comprising at least one of a chip power-on signal, an enable signal transmitted by the controller via the first data channel or the second data channel, and address data transmitted by the controller via the first data channel or the second data channel.

In some embodiments, a content relayed via the first data channel comprises an enable signal generated by the LED driver circuit of a current stage or an address data packet which is repackaged by the LED driver circuit of the current stage.

In some embodiments, in a case that the LED driver circuit of the current stage repackages the address data packet, the LED driver circuit of the current stage is configured to generate an address data packet for the LED driver circuit of a subsequent stage by removing an address of the LED driver circuit of the current stage from an address data packet provided by the controller, or to perform an accumulation operation or a degressive operation on the address of the LED driver circuit of the current stage to obtain the address data packet for the LED driver circuit of the subsequent stage.

In some embodiments, each stage of the plurality of LED driver circuits is configured to intercept data of a corresponding time period from at least one of the configuration data packet, the brightness data packet and the display data packet, as data of that stage, according to the enable signal.

In some embodiments, each stage of the plurality of LED driver circuits is configured to intercept data of a corresponding address from at least one of the configuration data packet, the brightness data packet and the display data packet, as data of that stage, according to the address data packet.

In some embodiments, the controller is configured to provide a read-back instruction packet via one of the first data channel and the second data channel, each stage of the plurality of LED driver circuits is configured to intercept corresponding data from the read-back instruction packet to obtain a read-back control instruction of that stage according to the enable signal or the address data packet, and execute the read-back control instruction to obtain state data of that stage.

In some embodiments, the plurality of LED driver circuits are configured to package and relay the state data stage by stage, and return a state data packet to the first controller data port of the controller via the first data channel.

In some embodiments, each stage of the plurality of LED driver circuits is configured to package the state data packet of that stage, and transmit the state data packet of that stage back to the second controller data port of the controller via the second data channel according to a time-sharing multiplexing mechanism.

In some embodiments, the LED display system comprises any one of a liquid crystal display screen with backlight emitted by an LED and an LED display screen with an LED serving as a pixel unit.

According to a second aspect of the present disclosure, a multi-wire communication method for an LED display system is provided, the LED display system comprises a plurality of LED driver circuits, each of which comprises a first circuit data port, a second circuit data port and a third circuit data port, and the multi-wire communication method comprises: connecting, by use of the first circuit data ports and the second circuit data ports of the LED driver circuits, the plurality of LED driver circuits in cascade to provide a first data channel; connecting, by use of the third circuit data ports of the LED driver circuits, the plurality of LED driver circuits in parallel to provide a second data channel; relaying, by use of the first data channel, an enable signal or address data stage by stage; and transmitting, by use of the second data channel, at least one of a configuration data packet, a brightness data packet and a display data packet in parallel.

In some embodiments, the second circuit data port of a last-stage LED driver circuit is connected to a constant voltage level.

In some embodiments, the constant voltage level is a voltage level at a power supply terminal or a ground terminal.

In some embodiments, the plurality of LED driver circuits are configured to initiate address allocation based on a trigger signal comprising at least one of a chip power-on signal, an enable signal transmitted by the controller via the first data channel or the second data channel, and address data transmitted by the controller via the first data channel or the second data channel.

In some embodiments, in a case that the trigger signal is the chip power-on signal, one of the first circuit data port of the first-stage LED driver circuit and the second circuit data port of the last-stage LED driver circuit is connected to a constant voltage level.

In some embodiments, a content relayed via the first data channel comprises an enable signal generated by the LED driver circuit of a current stage and an address data packet repackaged by the LED driver circuit of the current stage.

In some embodiments, in a case that the LED driver circuit of the current stage repackages the address data packet, the LED driver circuit of the current stage is configured to generate an address data packet of the LED driver circuit of a subsequent stage by removing an address of the LED driver circuit of the current stage from an address data packet provided by the controller, or to perform an accumulation operation or a degressive operation on the address of the LED driver circuit of the current stage to obtain the address data packet for the LED driver circuit of the subsequent stage.

In some embodiments, each stage of the plurality of LED driver circuits is configured to intercept data of a corresponding time period from at least one of the configuration data packet, the brightness data packet and the display data packet, as data of that stage, according to the enable signal.

In some embodiments, each stage of the plurality of LED driver circuits is configured to intercept data of a corresponding address from at least one of the configuration data packet, the brightness data packet and the display data packet, as data of that stage, according to the address data.

In some embodiments, the controller is configured to provide a read-back instruction packet via one of the first data channel and the second data channel, each stage of the plurality of LED driver circuits is configured to intercept corresponding data from the read-back instruction packet to obtain a read-back control instruction of that stage according to the enable signal or the address data, and execute the read-back control instruction to obtain state data of that stage.

In some embodiments, the plurality of LED driver circuits are configured to package and relay the state data stage by stage, and return a state data packet to a first controller data port of the controller via the first data channel.

In some embodiments, each stage of the plurality of LED driver circuits is configured to package the state data packet of that stage, and transmit the state data packet of that stage back to a second controller data port of the controller via the second data channel according to a time-sharing multiplexing mechanism.

According to a third aspect of the present disclosure, an LED driver circuit for an LED display system is provided, and comprises: a first circuit data port and a second circuit data port, by use of which the LED driver circuit is connected in cascade as one of a plurality of LED driver circuits, to provide a first data channel; a third circuit data port, by use of which the LED driver circuit is connected in parallel with the plurality of LED driver circuits other than that LED driver circuit, to provide a second data channel; and a plurality of current driving terminals, connected with a plurality of LEDs to provide driving currents, respectively, wherein the LED driver circuit is configured to receive an enable signal or address data from the first data channel, and receive at least one of a configuration data packet, a brightness data packet, and a display data packet from the second data channel.

In some embodiments, the LED driver circuit is configured to generate an enable signal or repackage an address data packet, wherein the enable signal or the address data serves as a content to be relayed via the first data channel.

In some embodiments, in a case that the LED driver circuit repackages the address data packet, the LED driver circuit is configured to generate the address data packet of another LED driver circuit of a subsequent stage by removing an address of the LED driver circuit from the address data packet provided by the controller, or to perform an accumulation operation or a degressive operation on the address of the LED driver circuit to obtain the address data packet for said another LED driver circuit of the subsequent stage.

In some embodiments, each stage of the plurality of LED driver circuits is configured to intercept data of a corresponding time period from at least one of the configuration data packet, the brightness data packet and the display data packet, as data of that stage, according to the enable signal.

In some embodiments, each stage of the plurality of LED driver circuits is configured to intercept data of a corresponding address from at least one of the configuration data packet, the brightness data packet and the display data packet, as data of that stage, according to the address data.

In some embodiments, the LED driver circuit is configured to receive a read-back instruction packet via one of the first data channel and the second data channel, intercept corresponding data from the read-back instruction packet to obtain a read-back control instruction of a current stage according to the enable signal or the address data, and execute the read-back control instruction to obtain state data of the current stage.

In some embodiments, the plurality of LED driver circuits are configured to package and relay the state data stage by stage, and return the state data packet back to a first controller data port of the controller via the first data channel.

In some embodiments, each stage of the plurality of LED driver circuits is configured to package the state data packet of that state, and transmit the state data packet back to a second controller data port of the controller via the second data channel according to a time-sharing multiplexing mechanism.

In the multi-wire communication device and the multi-wire communication method according to above embodiments of the present disclosure, the plurality of LED driver circuits are cascaded to provide the first data channel by use of the first circuit data ports and the second circuit data ports of the LED driver circuits, and are connected in parallel by use of the third circuit data ports of the LED driver circuits to provide the second data channel. The first data channel is used for relaying the enable signal or the address data, and the second data channel is used for transmitting at least one of the configuration data packet, the brightness data packet and the display data packet in parallel. Each stage of the plurality of LED driver circuits is configured to intercept data of that stage from a data packet on the second data channel according to the enable signal or the address data. Compared to the prior art using a single data channel, each stage of the plurality of LED driver circuits do not need to receive data, which is shifted stage by stage, from the LED driver circuit of an adjacent stage, but is configured to directly receive data from the second data channel connected to the controller. The multi-wire communication device and the multi-wire communication method can minimize a delay caused by data processing performed by the plurality of LED driver circuits, thus the cascading of the plurality of LED driver circuits can be supported and data rate can be increased.

In a preferred embodiment, in the multi-wire communication device and the multi-wire communication method, an address allocation phase and a data transmission phase are provided for the plurality of LED driver circuits, wherein each stage of the plurality of LED driver circuits is configured to intercept configuration data of a corresponding address from the configuration data packet and store the configuration data in a configuration register of that stage according to the address of that stage. In the data transmission phase, the first data channel is in idle state, and data is transmitted via the second data channel. Each stage of the plurality of LED driver circuits is configured to intercept data of corresponding address from the data packet on the second data channel based on the address of that stage to obtain data of that stage. The multi-wire communication device and the multi-wire communication method can eliminate a delay caused by data processing by a plurality of LED driver circuits, thereby it can be supported that number of the plurality of LED driver circuits which are cascaded can be infinite and data rate can be increased.

In a preferred embodiment, in the multi-wire communication device and the multi-wire communication method, the first data channel and the second data channel only require wiring for serial data communication, thus reducing wiring area.

BRIEF DESCRIPTION OF THE DRAWINGS

In order to more clearly explain embodiments of the present disclosure or a technical solution in the prior art, drawings required for describing embodiments of the present disclosure or the prior art will be briefly described below. It will be apparent that the drawings in the following description only show some embodiments of the present disclosure, and other drawings may be obtained from the provided drawings without any creative effort by those of ordinary skill in the art.

DETAILED DESCRIPTION OF EMBODIMENTS OF THE DISCLOSURE

Figure 1:
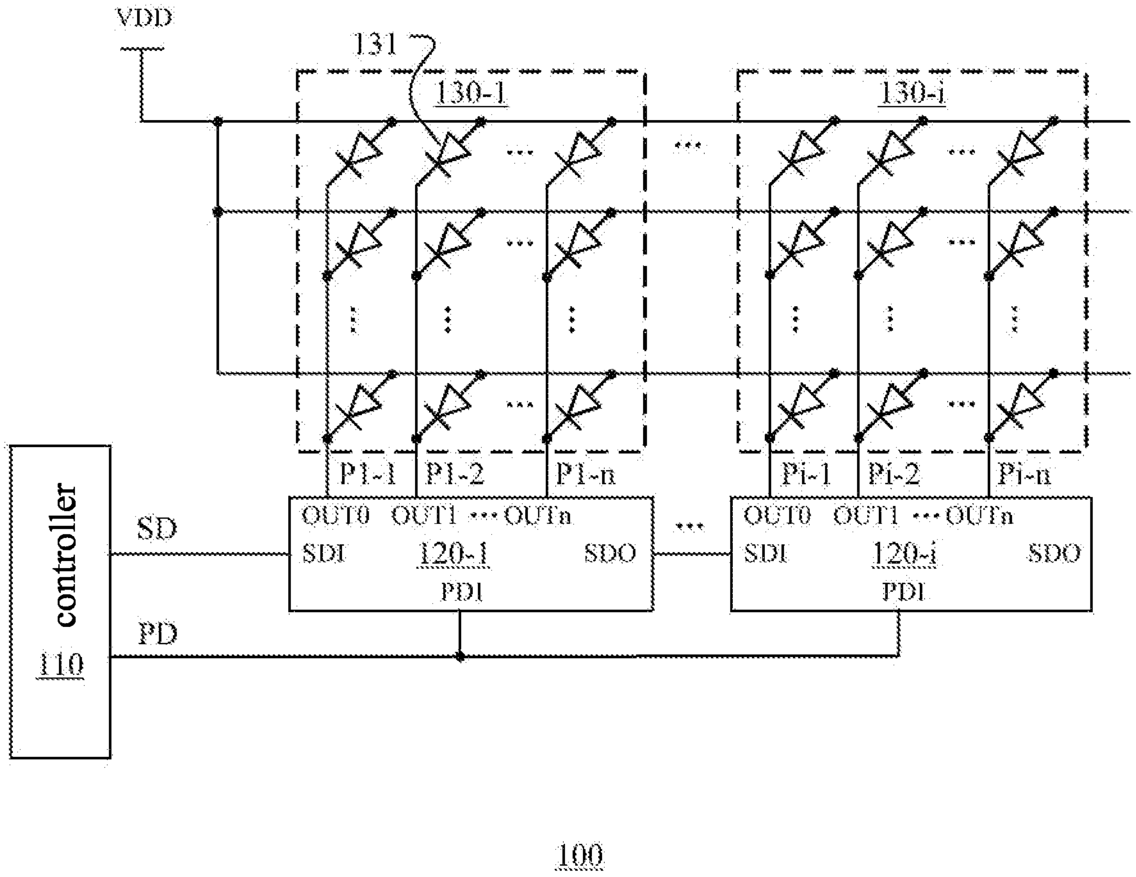
FIG. 1 shows a schematic block diagram of a backlight module according to a first embodiment of the present disclosure.

The present disclosure is described below based on embodiments. However, the present disclosure is not limited to these embodiments. In the following detailed description of the present disclosure, some specific details are described in detail. The present disclosure may also be fully understood by those skilled in the art without a description of these details. To avoid obscuring substantial aspects of the present disclosure, well known methods, procedures, flows, components and circuitry are not described in detail.

Furthermore, it will be understood by those of ordinary skill in the art that the drawings provided herein are for purposes of illustration and are not necessarily drawn to scale.

Also, it should be understood that in the following description, "circuit" refers to a conductive loop formed by at least one element or sub-circuit through an electrical or electromagnetic connection. When an element or circuit is "connected to" another element or an element/circuit is "connected between" two nodes, it may be directly coupled or connected to another element or there may be an intermediate element, and the connection between the elements may be physical, logical, or a combination thereof. Conversely, when an element is called "directly coupled to" or "directly connected to" another element, it means that there is no intermediate element between them.

Unless the context expressly requires, the words "comprising", "including" and the like throughout the description and the claims shall be construed in the meaning of inclusion and not in an exclusive or exhaustive sense. That is to say, it means "including but not limited to".

In the description of the present disclosure, it is to be understood that the terms "first", "second" and the like are used for descriptive purposes only and cannot be understood to indicate or imply relative importance. Furthermore, in the description of the present disclosure, "plurality" or "multiple" means two or more unless otherwise stated.

In the description herein, terms "the first-stage LED driver circuit" and "the last-stage LED driver circuit", "the first circuit data port" and "the second circuit data port" are defined in terms of a connection relationship between the LED driver circuits and the first controller data port SDO of the controller.

In the first data channel, "the first circuit data port" of "the first-stage LED driver circuit" is directly connected to the first controller data port SDO of the controller, the "the last-stage LED driver circuit" is the last LED driver circuit on the first data channel, and "the first circuit data port" of "the last-stage LED driver circuit" is connected to the second circuit data port of the LED driver circuit of a previous stage.

It can be understood that, in each stage of the LED driver circuits, since each circuit data port can be implemented by a tri-state port, the first circuit data port of the LED driver circuit can be dynamically configured as one of an input data port and an output data port, and the second circuit data port can be dynamically configured as the other of the input data port and the output data port, according to data relaying direction, which will not be described in detail below.

FIG. 1 shows a schematic block diagram of a backlight module according to a first embodiment of the present disclosure.

The backlight module 100 comprises: a controller 110, a plurality of LED driver circuits 120-1 to 120-*i*, and a plurality of LED blocks 130-1 to 130-*i*, where i represents an arbitrary natural number.

In a liquid crystal display screen, a liquid crystal panel comprises: a TFT array substrate, a color filter, and a liquid crystal layer sandwiched between the TFT array substrate and the color filter. The TFT array substrate is used for controlling the transmittance of the liquid crystal layer. The backlight module 100 is located below the array substrate and serves as a light source for providing backlight. After passing through the liquid crystal panel, light having brightness corresponding to a grayscale of a pixel can be obtained.

In the present embodiment, the LED blocks 130-1 to 130-*i* each comprise a plurality of LEDs 131 arranged in an array. The LED blocks 130-1 to 130-*i*, each as a whole, are also arranged in an array, so that a plurality of point light sources are used to form an area light source.

In the present embodiment, in the LED blocks 130-1 to 130-*i*, cathodes of LEDs in each row are connected together and connected to a corresponding one of current driving terminals of the LED driver circuit, anodes of LEDs in each row are connected together and the anodes of all rows of LEDs are jointly connected to a power supply terminal. Therefore, according to brightness data, current flowing through the corresponding one of the current driving terminals of the LED driver circuit is adjusted by duty cycle or amplitude, and the brightness of LEDs in a corresponding column can be changed. In an alternative embodiment, in the LED blocks 130-1 to 130-*i*, the anodes of LEDs in each column may be connected to the power supply terminals, respectively, for receiving independent power supply, or the anodes of LEDs in at least some columns may be connected to a same power supply terminal for receiving independent power supply. In an alternative embodiment, the plurality of LEDs 131 in the backlight module 100 are arranged in an array but connected into a single LED string, and a cathode of the LED string is connected to a corresponding one of the current driving terminals of the LED driver circuit. Thus, a single current driving terminal of the LED driver circuit can also be capable of driving all LEDs in one LED block.

The controller 110 comprises a first controller data port SDO and a second controller data port PDO. In this embodiment, although not shown in the figures, the controller 110 may be connected to a front-stage image processing engine SOC (System on Chip) via an SPI bus or other communication bus, to receive image data or brightness data.

The LED driver circuits 120-1 to 120-*i* each comprise a first circuit data port SDI, a second circuit data port SDO, a third circuit data port PDI, and current driving terminals OUT0 to OUTn, where n represents an arbitrary natural number. The LED driver circuits 120-1 to 120-*i* are cascaded with each other to provide a first data channel, that is, a first circuit data port SDO of the LED driver circuits of a previous stage is connected to a first circuit data port SDI of the LED driver circuit of a subsequent stage. The LED driver circuits 120-1 to 120-*i* are connected in parallel with each other to provide a second data channel, that is, a third circuit data port PDI of each LED driver circuit is connected to a second controller data port PDO of the controller 110 via the second data channel PD.

Further, the first controller data port SDO of the controller 110 is connected to a first circuit data port SDI of a first-stage LED driver circuit in the LED driver circuits 120-1 to 120-*i*, and the second controller data port PDO of the controller 110 is connected to the third circuit data port PDI of each one of the LED driver circuits via the second data channel PD. Thus, the controller 110 may transmit at least one of brightness data configuration data address data and an enable signal via the first data channel and the second data channel.

In this embodiment, the first circuit data port SDI of the first-stage LED driver circuit 120-1 is connected to the first controller data port SDO of the controller 110 via the first data channel SD, and a second circuit data port SDO of a last-stage LED driver circuit 120-*i* is suspended. Each of the first circuit data ports SDI and the second circuit data ports SDO of the LED driver circuits 120-1 to 120-*i* is a tri-state port and may be configured as one of an input port and an output port. A physical connection of the first data channel may be realized by a single wire. A physical connection of the second data channel may be realized by a single wire or double wires. For realizing the first data channel or the second data channel, the single wire can be a single data line, and the double wires can be formed by a data line and a clock line, or by two differential data lines. In this embodiment, even if no clock line is used in the first data channel and the second data channel, ultra-high speed data transmission can be realized by an embedded clock technology.

In a display mode of the backlight module 100, LED brightness data is transmitted via the second data channel. In the plurality of LED driver circuits 120-1 to 120-*i*, each one of the plurality of current driving terminals is configured to apply a constant current to a corresponding LED string connected to that current driving terminal. According to the LED brightness data, the duty cycle or the amplitude of the current flowing through that current driving terminal of the corresponding LED driver circuit can be adjusted, which can change an equivalent current flowing through the LEDs in the corresponding LED string, thus adjusting backlight brightness in different partitions.

Figure 2:
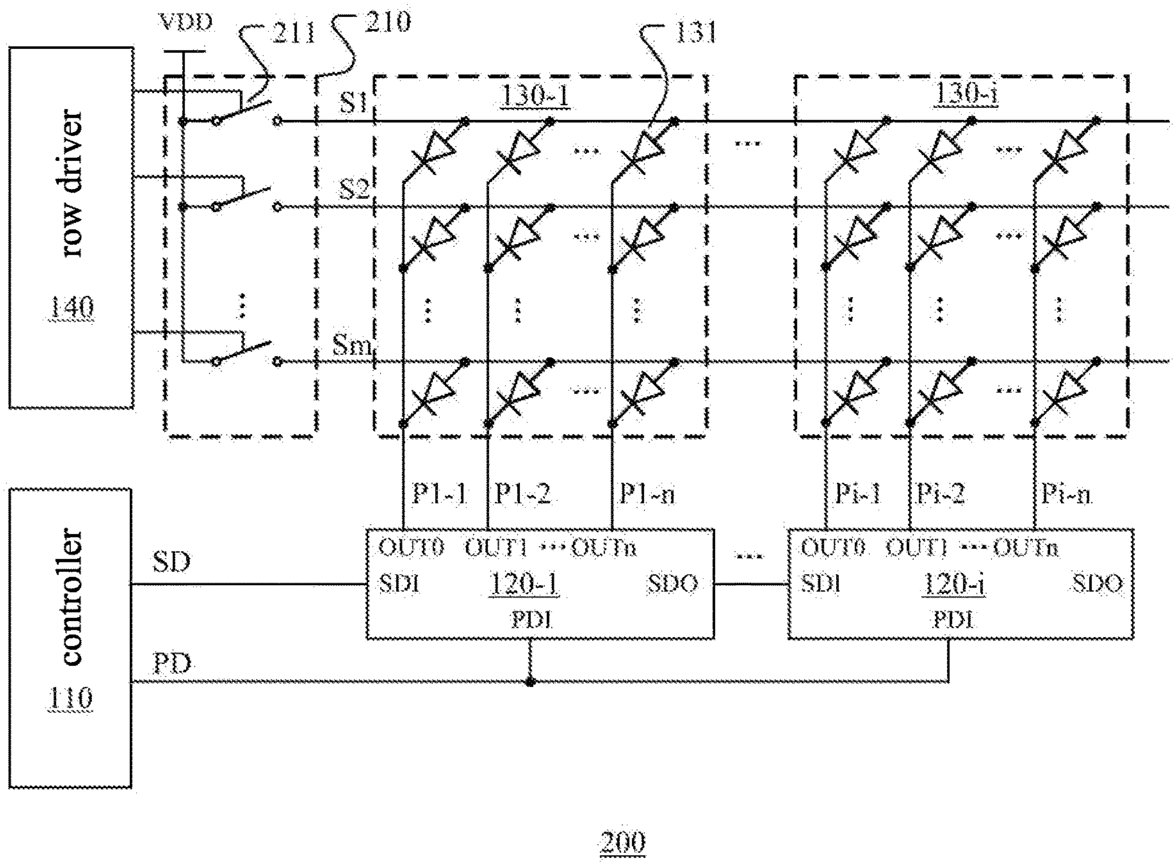
FIG. 2 shows a schematic block diagram of an LED display system according to a second embodiment of the present disclosure.

FIG. 2 shows a schematic block diagram of an LED display system according to a second embodiment of the present disclosure.

The LED display system 200 comprises: a controller 110, a plurality of LED driver circuits 120-1 to 120-*i*, a plurality of LED blocks 130-1 to 130-*i*, a row driver 140, and a switch array 210, where i represents an arbitrary natural number.

In the present embodiment, the LED blocks 130-1 to 130-*i* each comprise a plurality of LEDs 131 arranged in an array. The LED blocks 130-1 to 130-*i*, each as a whole, are also arranged in an array. Anodes of LEDs in a same row of the plurality of LEDs 131 is connected to a corresponding one of row lines S1 to Sm, and cathodes of LEDs in a same column of the plurality of LEDs 131 is connected to a corresponding one of column lines P1-1 to Pi-n.

In the LED display system, each LED is used as a sub-pixel unit. When an image is being displayed, a grayscale of each sub-pixel unit of the image corresponds to brightness, and a pixel array is formed by a plurality of sub-pixel units. It should be understood that each sub-pixel unit in the LED display system corresponds to a red/green/blue sub-pixel unit. For example, when a color image is being displayed, three adjacent LEDs can be used to display color components of red, green and blue, respectively, and each LED can generate light of corresponding color according to its own emitting characteristics, or an additional filter can be used to generate light of a corresponding color.

The switch array 210 comprises a plurality of switches 211. The row lines S1 to Sm are connected to a power supply terminal via a corresponding one of the plurality of switches 211. The row driver 140 is connected to the switch array 210 for providing switch control signals to the plurality of switches in the switch array 210, respectively.

The controller 110 comprises a first controller data port SDO and a second controller data port PDO. In this embodiment, although not shown in the figures, the controller 110 may be connected to a front-stage image processing engine SOC via an image communication bus (LVDS or VBYONE), to receive image data or brightness data.

The LED driver circuits 120-1 to 120-*i* each comprise a first circuit data port SDI, a second circuit data port SDO, a third circuit data port PDI, and current driving terminals OUT0 to OUTn, where n represents an arbitrary natural number. In the LED display system, the LED driver circuits 120-1 to 120-*i* are collectively operated as a column driver of the LED display system. Each of the LED driver circuits comprises the plurality of current driving terminals OUT1 to OUTn. The current driving terminals of the plurality of LED driver circuits 120-1 to 120-*i* each are connected to a corresponding one of the column lines P1-1 to Pi-n.

Further, the LED driver circuits 120-1 to 120-*i* are cascaded with each other to provide a first data channel, that is, the first circuit data port SDO of the LED driver circuit of a previous stage is connected to the first circuit data port SDI of the LED driver circuit of a subsequent stage. The LED driver circuits 120-1 to 120-*i* are connected in parallel with each other to provide a second data channel, that is, the third circuit data port PDI of each LED driver circuit is connected to the second controller data port PDO of the controller 110 via the second data channel PD.

Further, the first controller data port SDO of the controller 110 is connected to a first circuit data port SDI of the first-stage LED driver circuit in the LED driver circuits 120-1 to 120-*i*, and the second controller data port PDO of the controller 110 is connected to the third circuit data port PDI of each one of the LED driver circuits via the second data channel PD. Thus, the controller 110 may transmit at least one of the brightness data, the configuration data, the address data, the check data and the enable signal via the first data channel and the second data channel.

In this embodiment, the first circuit data port SDI of the first-stage LED driver circuit 120-1 is connected to the first controller data port SDO of the controller 110 via the first data channel SD, and a second circuit data port SDO of a last-stage LED driver circuit 120-*i* is suspended. Each of the first circuit data ports SDI and the second circuit data ports SDO of the LED driver circuits 120-1 to 120-*i* is a tri-state port and may be configured as one of an input port and an output port. A physical connection of the first data channel may be realized by a single wire. A physical connection of the second data channel may be realized by a single wire or double wires. For realizing the first data channel or the second data channel, the single wire can be a single data line, and the double wires can be formed by a data line and a clock line or two differential data lines. In this embodiment, even if no clock line is used in the first data channel and the second data channel, ultra-high speed data transmission can be realized by an embedded clock technology.

In a display mode of the LED display system 200, grayscale data of pixels of an image are transmitted via the second data channel. The row driver 140 is configured to perform scanning row by row and sequentially connect row lines to the power supply terminal. Accordingly, in the plurality of LED driver circuits 120-1 to 120-*i*, the plurality of current driving terminals are configured to apply constant currents to LEDs in a corresponding row, respectively. According to the grayscale data of pixels of the image, the duty cycle or amplitude of the current at a corresponding one of the current driving terminals of the LED driver circuits can be adjusted, so that an equivalent current flowing through each LED in the corresponding row can be changed, thereby one pixel line of the image can be displayed. In one frame period, a cumulative effective time of each LED in the pixel array coincides with the grayscale data of a corresponding pixel of the image.

Figure 3:
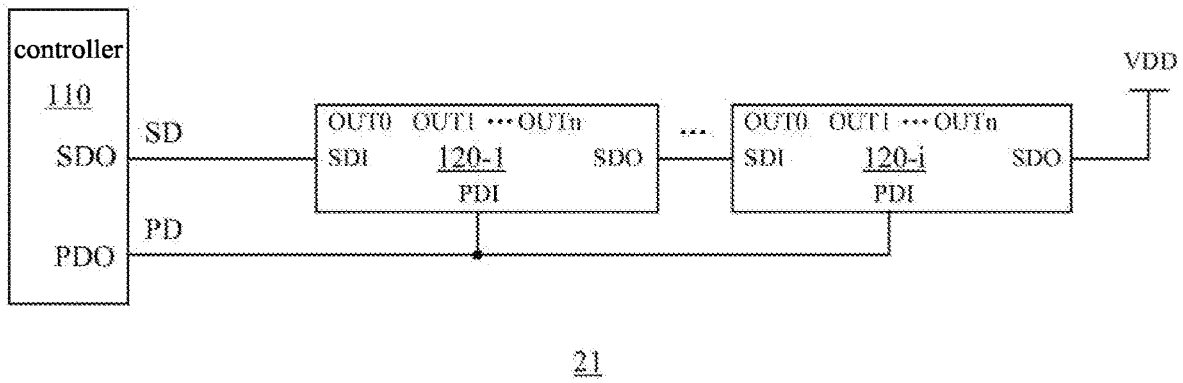
FIG. 3 shows a schematic block diagram of a multi-wire communication device according to a third embodiment of the present disclosure.

FIG. 3 shows a schematic block diagram of a multi-wire communication device according to a third embodiment of the present disclosure.

The multi-wire communication device 21 comprises: a controller 110 and a plurality of LED driver circuits 120-1 to 120-*i*. As described above, in the backlight module, the multi-wire communication device 21 is configured to transmit at least one of the brightness data, the configuration data address data, the check data and the enable signal. In the LED display system, the multi-wire communication device 21 is configured to transmit at least one of the grayscale data, the configuration data, the address data, the check data, and the enable signal.

The controller 110 comprises a first controller data port SDO and a second controller data port PDO. In this embodiment, although not shown in the figures, the controller 110 may be connected to a front-stage image processing engine SOC via the SPI bus to receive image data or brightness data.

The LED driver circuits 120-1 to 120-*i* each comprise a first circuit data port SDI, a second circuit data port SDO, a third circuit data port PDI, and current driving terminals OUT0 to OUTn, where n represents an arbitrary natural number. The LED driver circuits 120-1 to 120-*i* are cascaded to each other to provide a first data channel, that is, a second circuit data port SDO of the LED driver circuit of a previous stage is connected to a first circuit data port SDI of the LED driver circuit of a subsequent stage. The LED driver circuits 120-1 to 120-*i* are connected in parallel with each other to provide a second data channel, that is, the third circuit data port PDI of each LED driver circuit is connected to the second controller data port PDO of the controller 110 via the second data channel PD.

Further, a first controller data port SDO of the controller 110 is connected to a first circuit data port SDI of a first-stage LED driver circuit in the LED driver circuits 120-1 to 120-*i*, and the second controller data port PDO is connected to the third circuit data port PDI of each one of the LED driver circuits via the second data channel PD. Thus, the controller 110 may transmit at least one of the brightness data, the configuration data, the address data, the check data and the enable signal via the first data channel and the second data channel.

In this embodiment, the second circuit data port SDO of the last-stage LED driver circuit 120-*i* is connected to a power supply terminal VDD. Each of the first circuit data ports SDI and the second circuit data ports SDO of the LED driver circuits 120-1 to 120-*i* is a tri-state port and may be configured as one of an input port and an output port. As described above, a physical connection of the first data channel may be realized by a single wire. A physical connection of the second data channel may be realized by a single-wire or double wires, and no clock line is included in the first data channel and the second data channel.

When a chip with the backlight module is powered on, a front-stage image processing engine SOC is configured to provide a control signal to the controller 110 via a control interface according to predetermined power-on timing, and the controller 110 performs power-on initialization.

After the power-on initialization of the controller 110 is completed, the controller 110 may be operated in one of a display mode and an upgrade mode. Under the display mode of the controller 110, the front-stage image processing engine SOC is configured to transmit the brightness data to the controller 110 via the SPI bus. The controller 110 is configured to process the brightness data and then transmit the processed brightness data to the LED driver circuits 120-1 to 120-*i*. The LED driver circuits 120-1 to 120-*i* each perform duty cycle adjustment or amplitude adjustment on a current flowing through a corresponding one of the current driving terminals according to the brightness data, thereby changing the brightness of the LEDs of a corresponding column. Under the upgrade mode of the controller 110, the front-stage image processing engine SOC is configured to transmit upgrade data to the controller 110 via the SPI bus. The controller 110 is configured to update program or data of a current stage with the upgrade data, so that on-line upgrade function can be implemented after the device leaves factory, so as to improve user experience.

After the power-on initialization of the controller 110 is completed, the controller 110 generates a control command and a control signal, to perform configuration on the LED driver circuits 120-1 to 120-*i*. After the configuration is completed, the LED driver circuits 120-1 to 120-*i* enter the display mode. The controller 110 completes configuration and display control of the LED driver circuits, with the first data channel SD and the second data channel PD being cooperated with each other.

Figure 4:
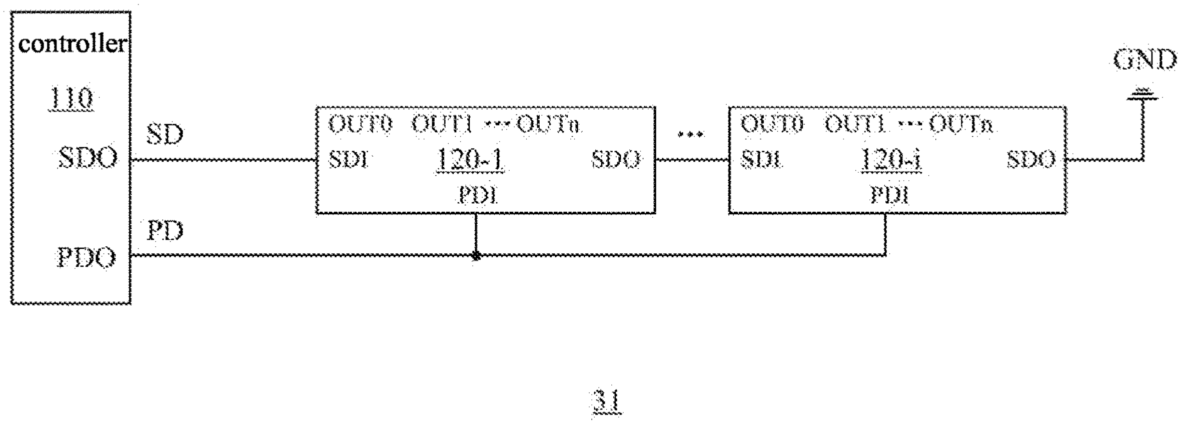
FIG. 4 shows a schematic block diagram of a multi-wire communication device according to a fourth embodiment of the present disclosure.

FIG. 4 shows a schematic block diagram of a multi-wire communication device according to a fourth embodiment of the present disclosure.

The multi-wire communication device 31 comprises: a controller 110 and a plurality of LED driver circuits 120-1 to 120-*i*. As described above, in the backlight module, the multi-wire communication device 31 is used for transmitting at least one of the brightness data, the configuration data, the address data, the check data and the enable signal. In an LED display system, the multi-wire communication device 31 is configured to transmit at least one of the grayscale data, the configuration data, the address data, the check data, and the enable signal.

The controller 110 comprises a first controller data port SDI and a second controller data port PDO. In this embodiment, although not shown in the figures, the controller 110 may be connected to a front-stage image processing engine SOC via the SPI bus to receive image data or brightness data.

The LED driver circuits 120-1 to 120-*i* each comprise a first circuit data port SDI, a second circuit data port SDO, a third circuit data port PDI, and current driving terminals OUT0 to OUTn, where n represents an arbitrary natural number. The LED driver circuits 120-1 to 120-*i* are cascaded to each other to provide a first data channel, that is, a second circuit data port SDO of the LED driver circuit of a previous stage is connected to a first circuit data port SDI of the LED driver circuit of a subsequent stage. The LED driver circuits 120-1 to 120-*i* are connected in parallel with each other to provide a second data channel, that is, the third circuit data port PDI of each LED driver circuit is connected to the second controller data port PDO of the controller 110 via the second data channel PD.

Further, the first controller data port SDO of the controller 110 is connected to a first circuit data port SDI of a first-stage LED driver circuit in the LED driver circuits 120-1 to 120-*i*, and the second controller data port PDO of the controller 110 is connected to the third circuit data port PDI of each one of the LED driver circuits via the second data channel PD. Thus, the controller 110 may transmit at least one of the brightness data the configuration data, the address data, the check data and the enable signal via the first data channel and the second data channel.

In the present embodiment, the second circuit data port SDO of a last-stage LED driver circuit 120-*i* is connected to a ground terminal GND. Each of the first circuit data ports SDI and the second circuit data ports SDO of the LED driver circuits 120-1 to 120-*i* is a tri-state port and may be configured as one of an input port and an output port. As described above, a physical connection of the first data channel may be realized by a single wire. A physical connection of the second data channel may be realized by a single wire or double wires, and no clock line is included in the first data channel and the second data channel.

When a chip with the backlight module is powered on, the front-stage image processing engine SOC is configured to provide a control signal to the controller 110 via a control interface according to predetermined power-on timing, and the controller 110 performs power-on initialization.

After the power-on initialization of the controller 110 is completed, the controller 110 may be operated in one of a display mode and an upgrade mode. Under the display mode of the controller 110, the front-stage image processing engine SOC is configured to transmit the brightness data to the controller 110 via the SPI bus. The controller 110 is configured to process the brightness data and then transmit the processed brightness data to the LED driver circuits 120-1 to 120-*i*. The LED driver circuits 120-1 to 120-*i* each perform duty cycle adjustment or amplitude adjustment on a current flowing through a corresponding one of the current driving terminals according to the brightness data, thereby changing the brightness of the LEDs of a corresponding column. Under the upgrade mode of the controller 110, the front-stage image processing engine SOC is configured to transmit upgrade data to the controller 110 via the SPI bus. The controller 110 is configured to update program or data of a current stage with the upgrade data, so that on-line upgrade function can be implemented after the device leaves factory, so as to improve user experience.

After the power-on initialization of the controller 110 is completed, the controller 110 generates a control command and a control signal, to perform configuration on the LED driver circuits 120-1 to 120-*i*. After the configuration is completed, the LED driver circuits 120-1 to 120-*i* enter the display mode. The controller 110 completes the configuration and display control of the LED driver circuits, with the first data channel SD and the second data channel PD being cooperated with each other.

Figure 5:
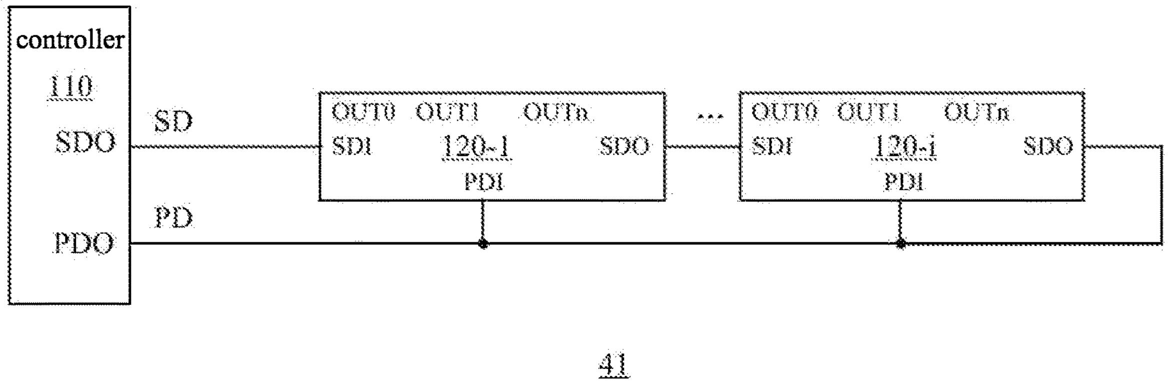
FIG. 5 shows a schematic block diagram of a multi-wire communication device according to a fifth embodiment of the present disclosure.

FIG. 5 shows a schematic block diagram of a multi-wire communication device according to a fifth embodiment of the present disclosure.

The multi-wire communication device 41 comprises: a controller 110 and a plurality of LED driver circuits 120-1 to 120-*i*. As described above, in the backlight module the multi-wire communication device 41 is configured to transmit at least one of the brightness data, the configuration data, the address data, the check data and the enable signal. In an LED display system, the multi-wire communication device 41 is configured to transmit at least one of the grayscale data, the configuration data, the address data, the check data, and the enable signal.

The controller 110 comprises a first controller data port SDO and a second controller data port PDO. In this embodiment, although not shown in the figures the controller 110 may be connected to a front-stage image processing engine SOC via the SPI bus, to receive image data or brightness data.

The LED driver circuits 120-1 to 120-*i* each comprise a first circuit data port SDI, a second circuit data port SDO, a third circuit data port PDI, and current driving terminals OUT0 to OUTn, where n represents an arbitrary natural number. The LED driver circuits 120-1 to 120-*i* are cascaded to each other to provide a first data channel, that is, a second circuit data port SDO of the LED driver circuit of a previous stage is connected to a first circuit data port SDI of the LED driver circuit of a subsequent stage. The LED driver circuits

120-1 to **120-*i* are connected in parallel with each other to provide a second data channel, that is, the third circuit data port PDI of each LED driver circuit is connected to the second controller data port PDO of the controller 110** via the second data channel PD.

Further, the first controller data port SDO of the controller 110 is connected to a first circuit data port SDI of a first-stage LED driver circuit in the LED driver circuits 120-1 to **120-*i*, and the second controller data port PDO of the controller 110 is connected to the third circuit data port PDI of each one of the LED driver circuits via the second data channel PD. Thus, the controller 110** may transmit at least one of the brightness data, the configuration data, the address data, the check data and the enable signal via the first data channel and the second data channel.

In the present embodiment, the second circuit data port SDO of a last-stage LED driver circuit **120-*i* is connected to the second controller data port PDO of the controller 110 via the second data channel PD. Each of the first circuit data ports SDI and the second circuit data ports SDO of the LED driver circuits 120-1 to 120-*i*** is a tri-state port and may be configured as one of an input port and an output port. As described above, a physical connection of the first data channel may be realized by a single wire. A physical connection of the second data channel may be realized by a single-wire or double wires, and no clock line is included in the first data channel and the second data channel.

When a chip with the backlight module is powered on, the front-stage image processing engine SOC is configured to provide a control signal to the controller 110 via a control interface according to predetermined power-on timing, and the controller 110 performs power-on initialization.

After the power-on initialization of the controller 110 is completed, the controller 110 may be operated in one of a display mode and an upgrade mode. Under the display mode of the controller 110, the front-stage image processing engine SOC is configured to transmit the brightness data to the controller 110 via the SPI bus. The controller 110 is configured to process the brightness data and then transmit the processed brightness data to the LED driver circuits 120-1 to **120-*i*. The LED driver circuits 120-1 to 120-*i* each perform duty cycle adjustment or amplitude adjustment on a current flowing through a corresponding one of the current driving terminals according to the brightness data, thereby changing the brightness of the LEDs of a corresponding column. Under the upgrade mode of the controller 110, the front-stage image processing engine SOC is configured to transmit the upgrade data to the controller 110 via the SPI bus. The controller 110** is configured to update program or data of a current stage with the upgrade data, so that on-line upgrade function can be implemented after the device leaves factory, so as to improve user experience.

After the power-on initialization of the controller 110 is completed, the controller 110 is configured to generate a control command and a control signal, to perform configuration on the LED driver circuits 120-1 to **120-*i*. After the configuration is completed, the LED driver circuits 120-1 to 120-*i* enter the display mode. The controller 110** completes the configuration and display control of the LED driver circuits, with the first data channel SD and the second data channel PD being cooperated with each other.

Figure 6:
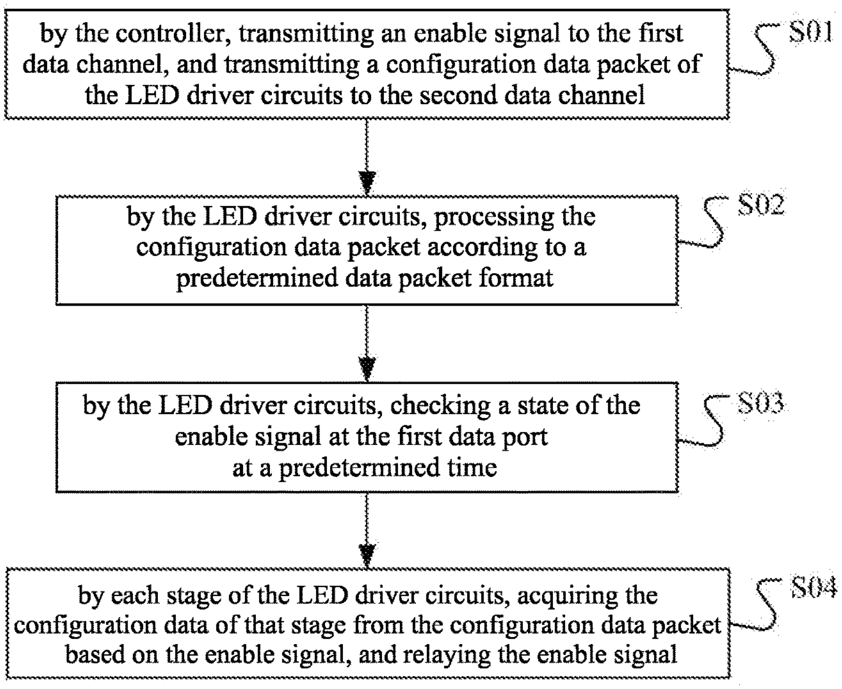
FIG. 6 shows a flowchart of a multi-wire communication method according to a sixth embodiment of the present disclosure.
Figure 7:
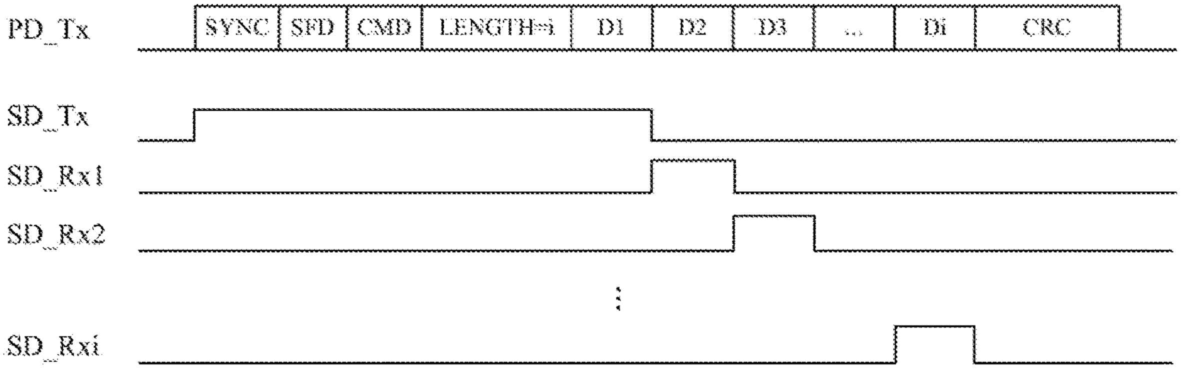
FIG. 7 shows a waveform diagram of the multi-wire communication method according to the sixth embodiment of the present disclosure.

FIG. 6 and FIG. 7 respectively show a flowchart and a waveform diagram of a multi-wire communication method according to a sixth embodiment of the present disclosure. Based on the enable signal relayed on the first data channel, data of a fixed time period is intercepted from a configuration data packet on the second data channel, so that the configuration data of a current stage is obtained. This method is applied, for example, to the multi-wire communication device as shown in FIGS. 3 to 5 and main steps of the multi-wire communication method are described below with reference to the multi-wire communication device shown in FIG. 3.

Specifically, under a configuration mode of the LED driver circuits, the multi-wire communication device 11 is configured to execute following steps S01 to S04.

In step S01, the controller 110 transmits an enable signal to the first data channel SD, and transmits a configuration data packet of a plurality of LED driver circuits to the second data channel PD.

Referring to FIG. 7, the second controller data port PDO of the controller 110 transmits the configuration data packet PD_Tx, which comprises a preamble field, a payload and a frame checksum CRC. The preamble field comprises a synchronization identifier SYNC, a start frame delimiter SFD, a command CMD, a data length LENGTH, and payload configuration data D1 to Di. The first controller data port SDO of the controller 110 transmits the enable signal SD_Tx. The enable signal SD_Tx is, for example, a pulse signal with a valid duration of a predetermined time length. For example, a time length of the valid duration of the enable signal SD_Tx may coincide with a total time length of durations of the preamble field and the configuration data D1 of the first stage.

In step S02, the plurality of LED driver circuits process the configuration data packet according to a predetermined data packet format.

In this step, the plurality of LED driver circuits each acquire at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected with each other by use a common clock line, synchronous data processing can be realized by use of the synchronous data in the preamble field.

In step S03, the plurality of LED driver circuits check a state of the enable signal at the first circuit data port SDI at a predetermined time. For describing this embodiment, the enable signal at high voltage level being in valid state is taken as an example. In an alternative embodiment, according to a circuit design requirement, the enable signal at low voltage level can be set as being in valid state.

In step S04, in a case that the enable signal of the first circuit data port SDI is in valid state, a corresponding LED driver circuit of the plurality of LED driver circuits acquires the configuration data of the corresponding stage from the configuration data packet, and sets the first circuit data port SDO of the corresponding LED driver circuit to valid state, thereby relaying the enable signal.

In this step, the first circuit data port SDI of the first-stage LED driver circuit 120-1 in the plurality of LED driver circuits receives the enable signal SD_Tx. The valid duration of the enable signal SD_Tx lasts until or to a moment before an end of a duration of the configuration data D1 of the first stage. Therefore, the first-stage LED driver circuit 120-1 can intercept the configuration data D1 of a fixed length, which serves as the configuration data of the first-stage LED driver circuit, from the configuration data packet according to the enable signal SD_Tx.

At or before the end of the duration of the configuration data D1 of the first state, the first-stage LED driver circuit 120-1 sets the second circuit data port SDO to valid state, so that the state of an enable signal SD_Rx1 received by the LED driver circuit 120-2 of a second stage is reversed to valid state. After a duration of the configuration data D2 of the second stage, the first-stage LED driver circuit 120-1 resets the second circuit data port SDO to idle state. Therefore, the valid duration of the enable signal SD_Rx1 coincides with the duration of the configuration data D2 of the second stage. Therefore, the LED driver circuit of the second stage can intercept data D2 of a fixed length, which serves as the configuration data of the LED driver circuit of the second stage, from the configuration data packet according to the enable signal SD_Rx1.

Similarly, each LED driver circuit of a subsequent stage receives the enable signal transmitted by the LED driver circuit of a corresponding previous stage, and acquires the configuration data of its current stage from the configuration data packet according to the received enable signal.

Further, under the display mode of the LED driver circuits, the multi-wire communication device 11 executes steps similar to the above-mentioned steps S01 to S04, relays the enable signal stage by stage via the first data channel, and transmits the brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of the present embodiment, the first data channel is used to relay the enable signal stage by stage, and the second data channel is used to transmit the configuration data in parallel. After the enable signal is relayed to all of the plurality of LED driver circuits in turn, each LED driver circuit can obtain the configuration data corresponding to that LED driver circuit.

The method does not require a hardware module for storing address in the plurality of LED driver circuits, and does not require an additional step for performing address allocation on the plurality of LED driver circuits. The method utilizes the first data channel to transmit the enable signal instead of transmitting address data, thus allowing any number of LED driver circuits being connected in cascade. The method utilizes the second data channel to transmit the configuration data and the display data, thus increasing data rate.

Figure 8:
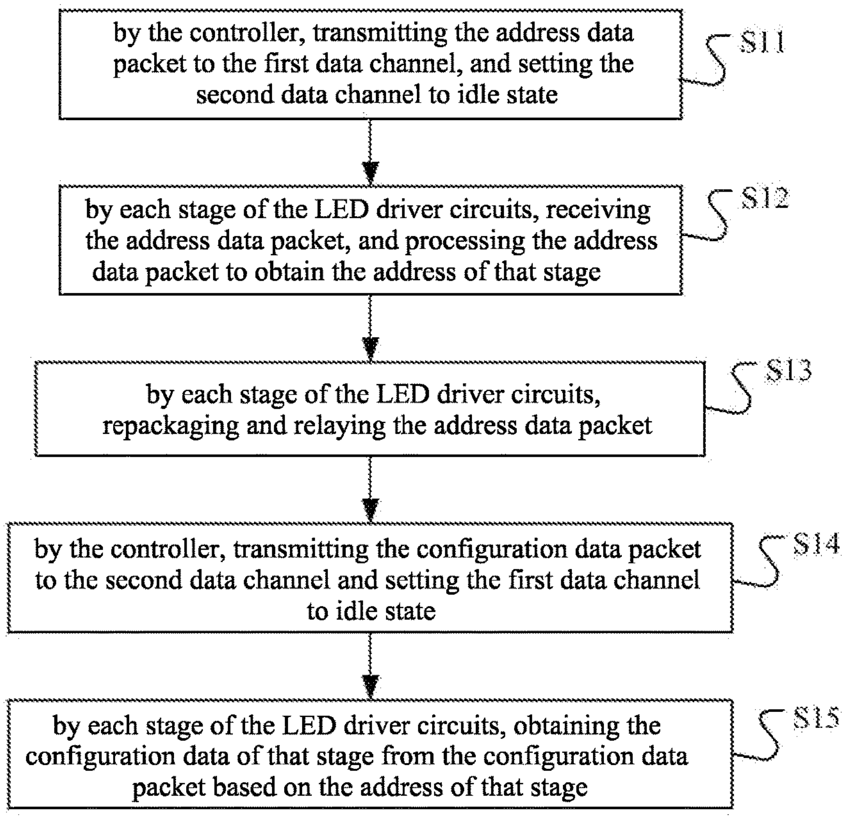
FIG. 8 shows a flowchart of a multi-wire communication method according to a seventh embodiment of the present disclosure.

FIG. 8 shows a flowchart of a multi-wire communication method according to a seventh embodiment of the present disclosure. The method comprises an address allocation phase and a configuration data transmission phase, which are executed continuously. Based on an address of a current stage, data of corresponding address is intercepted from the configuration data packet on the second data channel, to obtain the configuration data of the current stage. This method is applied, for example, to the multi-wire communication device as shown in FIGS. 3 to 5, and main steps of the multi-wire communication method are described below with reference to the multi-wire communication device as shown in FIG. 3.

Specifically, under the configuration mode of the LED driver circuits, the multi-wire communication device 11 executes steps S11 to S13 in the address allocation phase, and steps S14 to S15 in the configuration data transmission phase.

In step S11, the controller 110 transmits the address data packet of the plurality of LED driver circuits to the first data channel SD, and sets the second data channel PD to idle state.

Figure 9A:
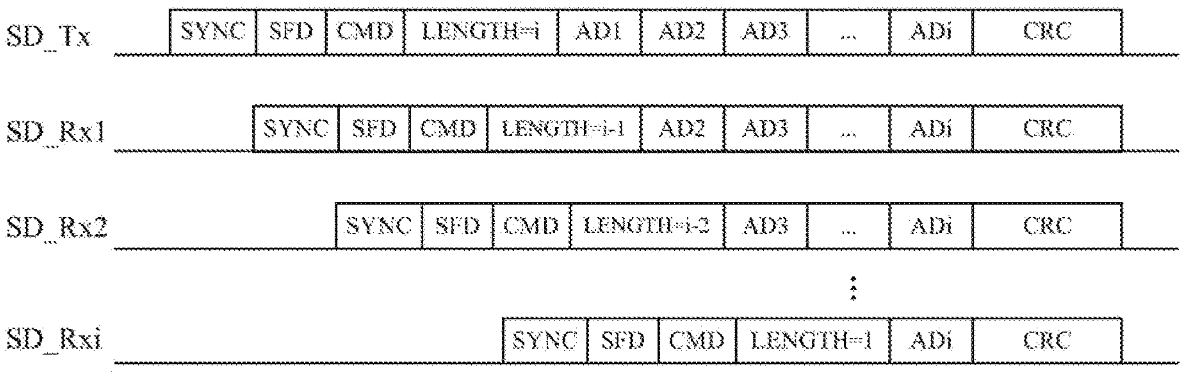
FIGS. 9*a* and 9*b* show waveform diagrams of the multi-wire communication method according to the seventh embodiment of the present disclosure in an address allocation phase and a configuration data transmission phase.

Referring to FIG. 9*a*, the first controller data port SDO of the controller 110 transmits the address data packet SD_Tx comprising a preamble field, a payload and a frame checksum CRC. The preamble field includes a synchronization identifier SYNC, a start frame delimiter SFD, a command CMD, a data length LENGTH, and payload address data AD1 to ADi.

In step S12, each stage of the LED driver circuits receives the corresponding address data packet from the LED driver circuit of a corresponding previous stage, and processes the received address data packet to obtain the address of that stage.

In this embodiment, each stage of the LED driver circuits intercepts data of a fixed time period from the received address data packet, to obtain the address of that stage. Further, each stage of the LED driver circuits stores the address of that stage in an address register of that stage.

In step S13, each stage of the LED driver circuits repackages and relays the address data packet for the LED driver circuit of a subsequent stage.

In this step, an operation of repackaging the address data packet comprises, for example, obtaining the address of that stage from the address data packet using a shift operation, and repackaging the preamble field and the address data of the subsequent stage in the address data packet into a new address data packet for the subsequent stage.

In step S14, the controller 110 transmits the configuration data packet of the plurality of LED driver circuits to the second data channel PD and sets the first data channel SD to idle state.

Figure 9B:
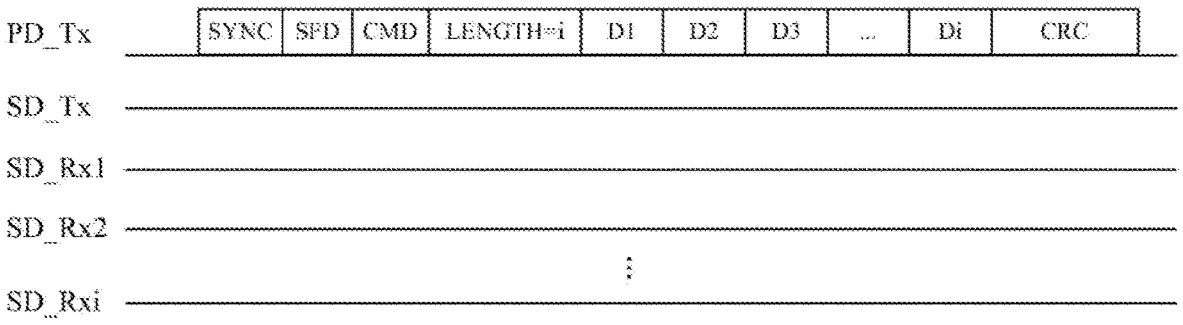

Referring to FIG. 9*b*, the second controller data port PDO of the controller 110 transmits a configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di In step S15, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of the synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S14 to S15, to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascaded to provide the first data channel, and the third circuit data ports PDI of the LED driver circuits are connected in parallel with each other to provide the second data channel. In the multi-wire communication method of this embodiment, the address data is relayed stage by stage by using the first data channel, and the configuration data is transmitted in parallel by using the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel to transmit the address data for dynamic address allocation, thus allowing any number of LED driver circuits being connected in cascade. The method utilizes the second data channel to transmit the configuration data and the display data, thus increasing data rate.

Figure 10:
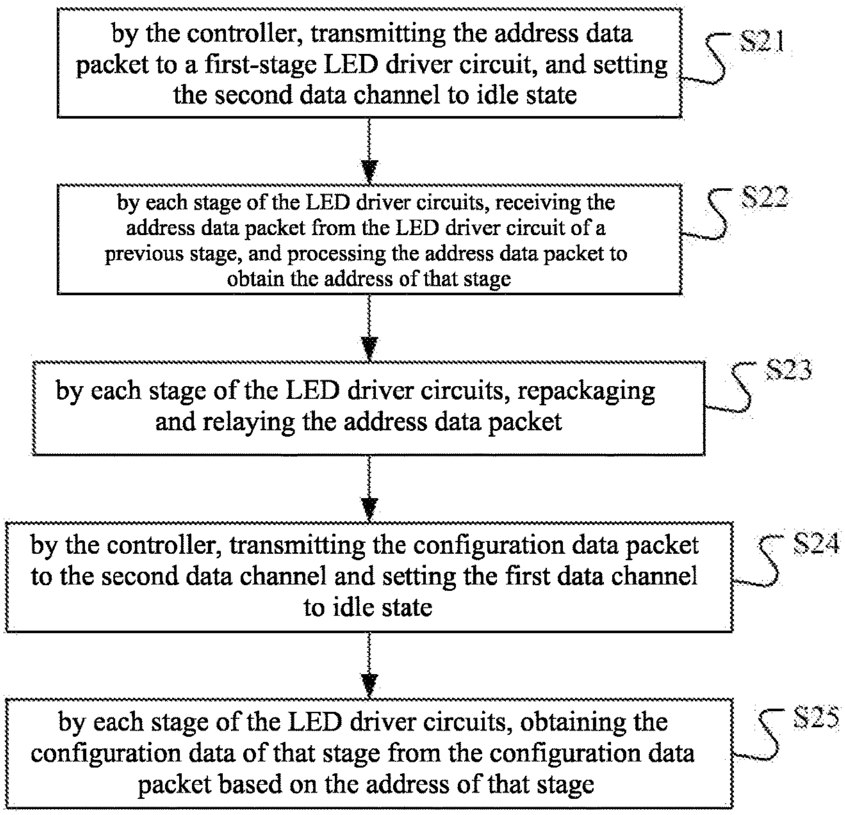
FIG. 10 shows a flowchart of a multi-wire communication method according to an eighth embodiment of the present disclosure.

FIG. 10 shows a flowchart of a multi-wire communication method according to an eighth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is applied, for example, to the multi-wire communication device as shown in FIGS. 3 to 5 and main steps of the multi-wire communication method are described below with reference to the multi-wire communication device as shown in FIG. 3.

Specifically, under the configuration mode of the LED driver circuits, the multi-wire communication device 11 executes steps S21 to S27 in the address allocation phase, and steps S24 to S25 in the configuration data transmission phase.

In step S21, the controller 110 transmits the address data packet of the first-stage LED driver circuit via the first data channel SD, and sets the second data channel PD to idle state.

Figure 11A:
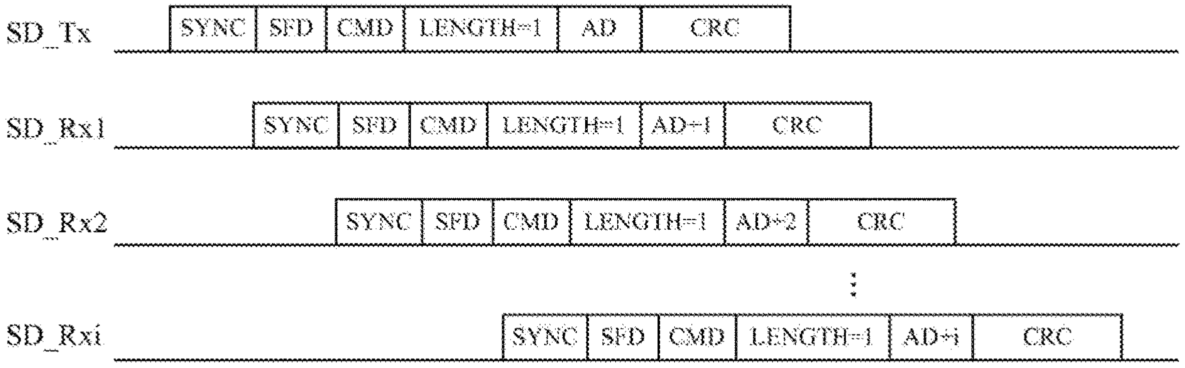
FIGS. 11*a* and 11*b* show waveform diagrams of the multi-wire communication method according to the eighth embodiment of the present disclosure in an address allocation phase and a configuration data transmission phase.

Referring to FIG. 11*a*, the first controller data port SDO of the controller 110 transmits the address data packet SD_Tx comprising a preamble field, a payload and a frame checksum CRC. The preamble field includes a synchronization identifier SYNC, a start frame delimiter SFD, a command CMD, a data length LENGTH, and a payload address data AD1.

In step S22, each stage of the LED driver circuits receives the corresponding address data packet from the LED driver circuit of a corresponding previous stage, and processes the received address data packet to obtain the address of that stage.

In this embodiment, each stage of the LED driver circuits intercepts data of a fixed time period from the received address data packet, to obtain the address of that stage. Further, each stage of the LED driver circuits stores the address of that stage in an address register of that stage.

In step S23, each stage of the LED driver circuits repackages and relays the address data packet for the LED driver circuit of a subsequent stage.

In this step, an operation of repackaging the address data packet comprises, for example, performing an accumulation operation or a degressive operation on the address of that stage, to obtain the address of the subsequent stage (for example, an increment of the accumulation operation or a decrement of the degressive operation being 1 or any other natural number), and repackaging the preamble field and the address data of the subsequent stage in the address data packet into a new address data packet for being transmitted to the subsequent stage.

In step S24, the controller 110 transmits the configuration data packet of the plurality of LED driver circuits to the second data channel PD and sets the first data channel SD to idle state.

Figure 11B:
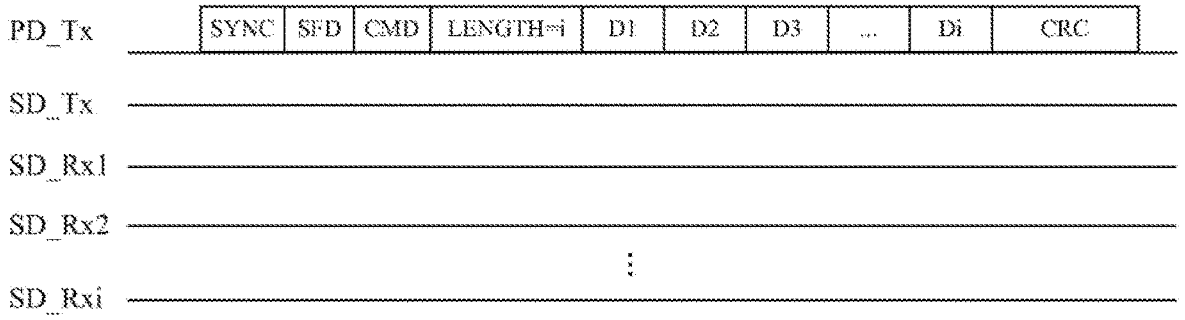

Referring to FIG. 11*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S25, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S24 to S25, to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by using the first data channel, and the configuration data is transmitted in parallel by using the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel to transmit address data for dynamic address allocation, thus allowing any number of LED driver circuits being connected in cascade. The method utilizes the second data channel to transmit the configuration data and the display data, thus increasing data rate.

Figure 12:
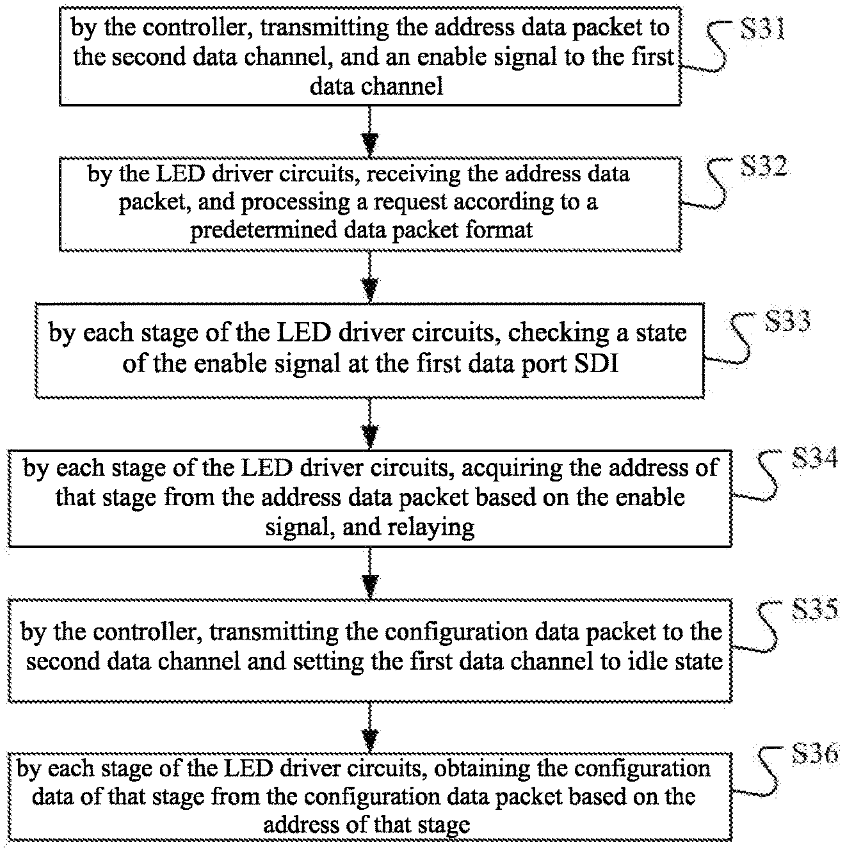
FIG. 12 shows a flowchart of a multi-wire communication method according to a ninth embodiment of the present disclosure.

FIG. 12 shows a flowchart and a waveform diagram of a multi-wire communication method according to a ninth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is applied, for example, to the multi-wire communication device as shown in FIGS. 3 to 5, and main steps of the multi-wire communication method are described below with reference to the multi-wire communication device as shown in FIG. 3.

Specifically, under the configuration mode of the LED driver circuits, the multi-wire communication device 11 executes steps S31 to S34 in the address allocation phase, and steps S35 to S36 in the configuration data transmission phase.

In step S31, the controller 110 transmits the address data packet of the plurality of LED driver circuits to the second data channel PD, and an enable signal to the first data channel SD.

Figure 13A:
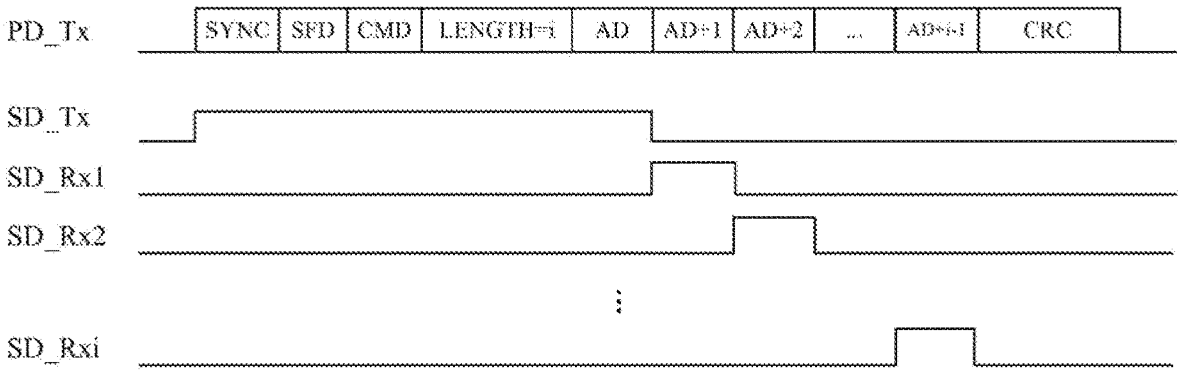
FIGS. 13*a* and 13*b* show waveform diagrams of the multi-wire communication method according to the ninth embodiment of the present disclosure in an address allocation phase and a configuration data transmission phase.

Referring to FIG. 13*a*, the second controller data port PDO of the controller 110 transmits the address data packet PD_Tx comprising a preamble field, a payload and a frame checksum CRC. The preamble field includes a synchronization identifier SYNC, a start frame delimiter SFD, a command CMD, a data length LENGTH, and a payload address data AD to ADi. The first controller data port SDO of the controller 110 transmits the enable signal SD_Tx. The enable signal SD_Tx is, for example, a pulse signal with a valid duration of a predetermined time length. For example, a time length of the valid duration of the enable signal SD_Tx may coincide with a total time length of durations of the preamble field and the address data AD of the first stage.

In step S32, the plurality of LED driver circuits process a request according to a predetermined data packet format after receiving the address data packet on the second data channel PD.

In step S33, the plurality of LED driver circuits each check a state of the enable signal at the first circuit data port SDI at a predetermined time. For describing this embodiment, the enable signal at high voltage level being in valid state is taken as an example. In an alternative embodiment, according to a circuit design requirement, the enable signal at low voltage level can be set as being in valid state.

In step S34, in a case that the enable signal of the first circuit data port SDI is in valid state, a corresponding LED driver circuit of the plurality of LED driver circuits acquires the address of the corresponding stage from the address data packet, and sets the second circuit data port SDO of the corresponding LED driver circuit to valid state, thereby relaying the enable signal.

In this step, the first circuit data port SDI of the first-stage LED driver circuit 120-1 in the plurality of LED driver circuits receives the enable signal SD_Tx. The valid duration of the enable signal SD_Tx lasts until or to a moment before an end of a duration of the address data AD of the first stage. Therefore, the first-stage LED driver circuit 120-1 can intercept the address data AD of a fixed length, which serves as the address of the first-stage LED driver circuit, from the address data packet according to the enable signal SD_Tx.

At or before the end of the address data AD of the first stage, the first-stage LED driver circuit 120-1 sets the second circuit data port SDO to valid state, so that the state of the enable signal SD_Rx1 received by the LED driver circuit 120-2 of a second stage is reversed to valid state. After a duration of the address data D2 of the second stage, the first-stage LED driver circuit 120-1 resets the second circuit data port SDO to idle state. Therefore, the valid duration of the enable signal SD_Rx1 coincides with the duration of the address data D2 of the second stage. Therefore, the LED driver circuit of the second stage can intercept data D2 of a fixed length, which serves as the address of the LED driver circuit of the second stage, from the address data packet according to the enable signal SD_Rx1.

Similarly, each LED driver circuit of a subsequent stage receives the enable signal transmitted by the LED driver circuit of a corresponding previous stage, and acquires the address of its current stage from the address data packet according to the received enable signal.

In step S35, the controller 110 transmits the configuration data packet of the plurality of LED driver circuits to the second data channel PD and sets the first data channel SD to idle state.

Figure 13B:
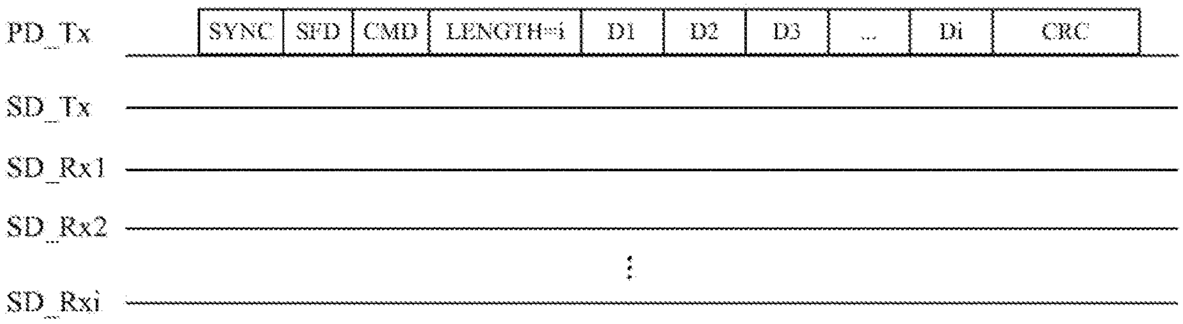

Referring to FIG. 13*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S36, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S35 to S36, and transmits brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of the present embodiment, in the address allocation phase, the first data channel is used for relaying the enable signal stage by stage, the second data channel is used for transmitting address data in parallel, and the second data channel is also used for transmitting configuration data in parallel in the configuration data transmission phase. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method intercepts data of a fixed time period from the address data packet based on the enable signal for dynamic address allocation, thus allowing any number of LED driver circuits being connected in cascade. The method transmits the address data, the configuration data and the display data by use of the second data channel, thus improving data rate.

Figure 14:
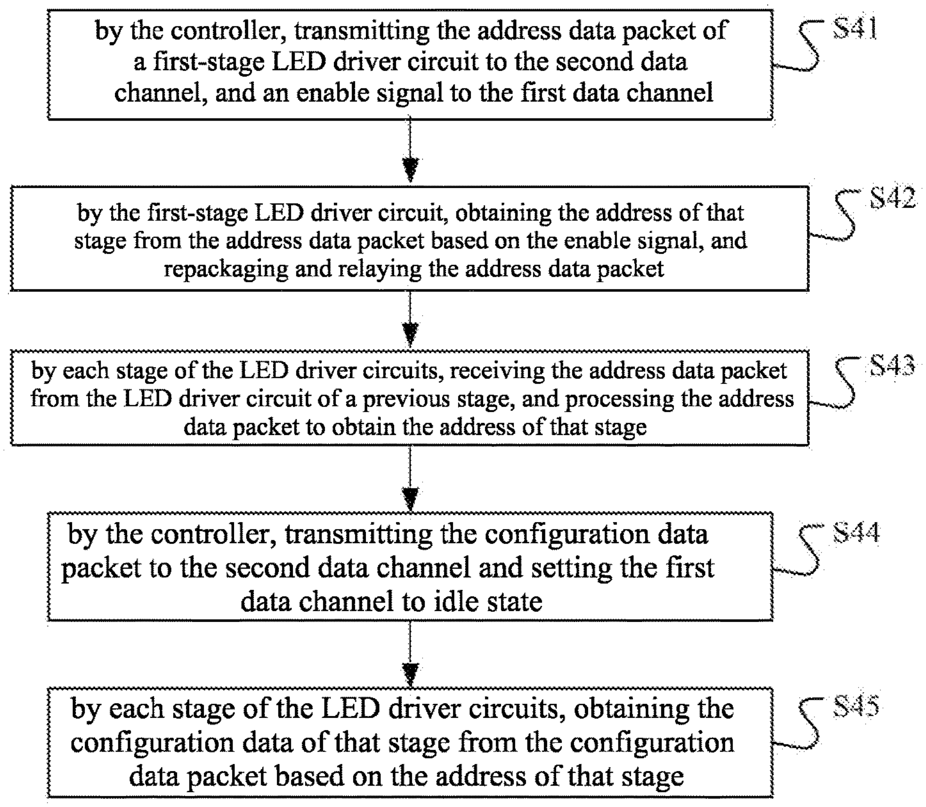
FIG. 14 shows a flowchart of a multi-wire communication method according to a tenth embodiment of the present disclosure.

FIG. 14 shows a flowchart of a multi-wire communication method according to a tenth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is applied, for example, to the multi-wire communication device as shown in FIGS. 3 to 5 and the main steps of the multi-wire communication method are described below with reference to the multi-wire communication device as shown in FIG. 3.

Specifically, under the configuration mode of the LED driver circuits, the multi-wire communication device 11 executes steps S41 to S43 in the address allocation phase, and steps S44 to S45 in the configuration data transmission phase.

In step S41, the controller 110 transmits the address data packet of the first-stage LED driver circuit to the second data channel PD, and transmits an enable signal to the first data channel SD.

Figure 15A:
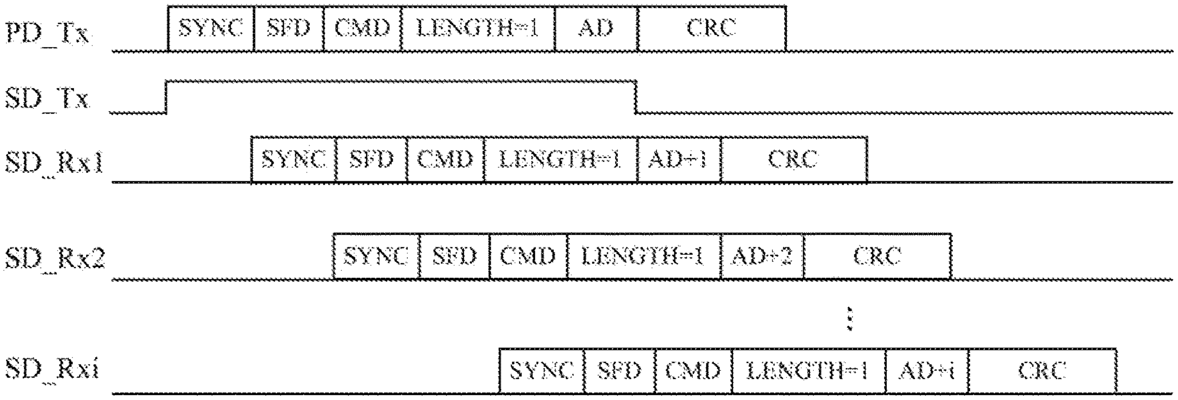
FIGS. 15*a* and 15*b* show waveform diagrams of the multi-wire communication method according to the tenth embodiment of the present disclosure in an address allocation phase and a configuration data transmission phase.

Referring to FIG. 15*a*, the second controller data port PDO of the controller 110 transmits the address data packet PD_Tx comprising a preamble field, a payload and a frame checksum CRC. The preamble field includes a synchronization identifier SYNC, a start frame delimiter SFD, a command CMD, a data length LENGTH, and a payload address data AD. The first controller data port SDO of the controller 110 transmits the enable signal SD_Tx. The enable signal SD_Tx Is, for example, a pulse signal with a valid duration of a predetermined time length. For example, a time length of the valid duration of the enable signal SD_Tx may coincide with a total time length of durations of the preamble field and the address data AD of the first stage.

In step S42, the first-stage LED driver circuit acquires the address of the first stage from the address data packet based on the enable signal, and repackages and relays the address data packet.

In this step, the first-stage LED driver circuit acquires at least one type of data in the preamble field from the address data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field.

In this step, the first circuit data port SDI of the first-stage LED driver circuit receives the enable signal SD_Tx. The valid duration of the enable signal SD_Tx lasts until or to a moment before an end of a duration of the address data AD of the first stage. Therefore, the first-stage LED driver circuit can intercept the address data AD of a fixed length, which serves as the address of the first-stage LED driver circuit, from the address data packet according to the enable signal SD_Tx, and store the address data AD in the configuration register of the first stage.

In this step, an operation of repackaging the address data packet comprises, for example, performing an accumulation operation or a degressive operation on the address of that stage, to obtain the address of a subsequent stage (for example, an increment of the accumulation operation or a decrement of the degressive operation being 1 or any natural number), and repackaging the preamble field and the address data of the subsequent stage in the address data packet into a new address data packet for being transmitted to the subsequent stage.

In step S43, each LED driver circuit of a subsequent stage receives the corresponding address data packet from the LED driver circuit of a corresponding previous stage, processes the received address data packet, acquires the address of the current stage, and repackages and relays the received address data packet.

In this step, an operation of repackaging the address data packets is same as the operation of repackaging in step S42 and is not going to be repeatedly described in detail here.

In this embodiment, each stage of the LED driver circuits intercepts data of a fixed time period from the received address data packet, to obtain the address of that stage.

Further, each stage of the LED driver circuits stores the address of that stage in an address register of that stage.

In step S44, the controller 110 transmits the configuration data packet of the LED driver circuits to the second data channel PD and sets the first data channel SD to idle state.

Figure 15B:
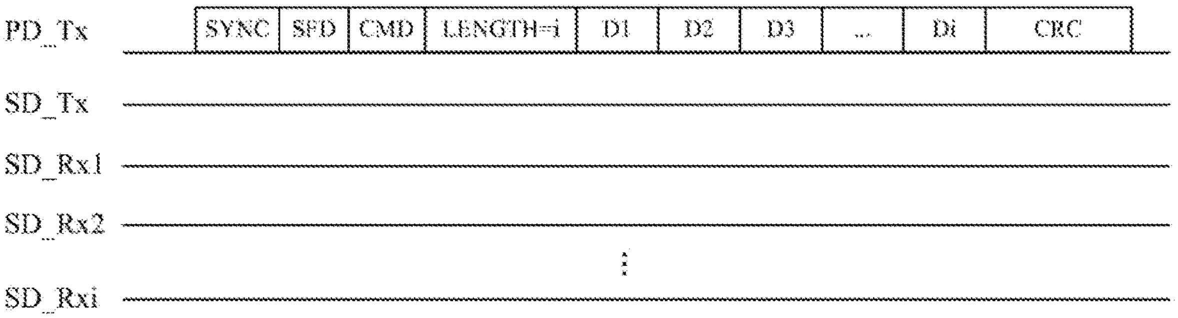

Referring to FIG. 15*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S45, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding addresses from the configuration data packet according to the address of that stage, and stores the configuration data in a configuration register of that stage.

Further, under the display mode of the LED driver circuits, the multi-wire communication device 11 performs steps similar to the above-described steps S44 to S45, to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by use of the first data channel, and the configuration data is transmitted in parallel by using the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel to transmit the address data for dynamic address allocation, thus allowing any number of LED driver circuits being connected in cascade. The method utilizes the second data channel to transmit the configuration data and the display data, thus increasing data rate.

Figure 16:
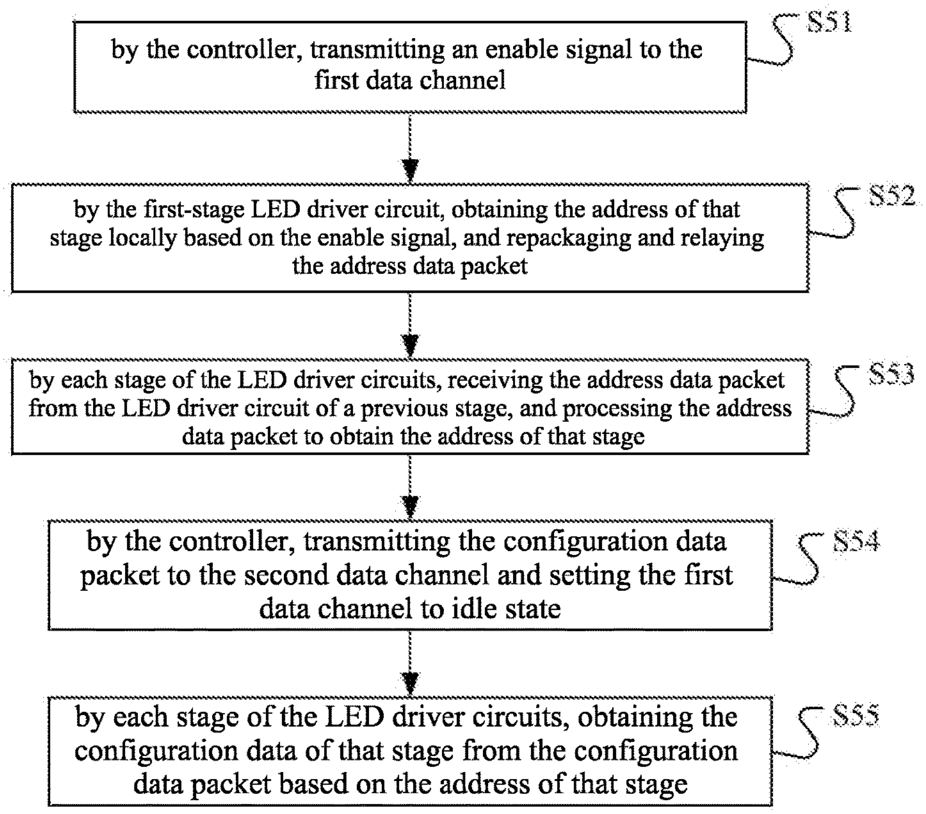
FIG. 16 shows a flowchart of a multi-wire communication method according to an eleventh embodiment of the present disclosure.

FIG. 16 shows a flowchart of a multi-wire communication method according to an eleventh embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is applied, for example, to the multi-wire communication device as shown in FIGS. 3 to 5 and main steps of the multi-wire communication method are described below with reference to the multi-wire communication device as shown in FIG. 3.

Specifically, under the configuration mode of the LED driver circuits, the multi-wire communication device 11 executes steps S51 to S53 in the address allocation phase, and steps S54 to S55 in the configuration data transmission phase.

In step S51, the controller 110 transmits an enable signal to the first data channel SD.

Figure 17A:
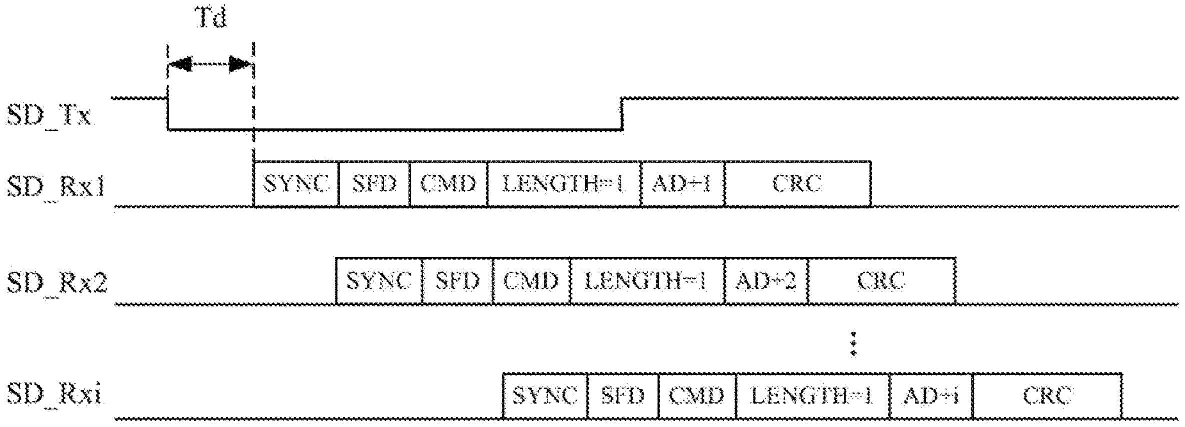
FIGS. 17*a* and 17*b* show waveform diagrams of the multi-wire communication method according to the eleventh embodiment of the present disclosure in an address allocation phase and a configuration data transmission phase.

Referring to FIG. 17*a*, the first controller data port SDO of the controller 110 transmits the enable signal SD_Tx. The enable signal SD_Tx is, for example, a pulse signal with a valid duration of a predetermined time length. For example, as shown in the figure, the enable signal at low voltage level is in valid state. For example, a time length of a valid duration of the enable signal SD_Tx is, for example, less than or equal to a total time length of durations of the preamble field of the configuration data packet as described below.

In step S52, the first-stage LED driver circuit actively generates the address of the first stage locally based on the enable signal, and repackages and relays the address data packet.

In this step, the first circuit data port SDI of the first-stage LED driver circuit receives the enable signal SD_Tx. When the valid duration of the enable signal SD_Tx exceeds a predetermined time period Td, the first-stage LED driver circuit can set the address of the first stage as a start address (e.g., 0 or any natural number) according to the enable signal SD_Tx, and store the address of the first stage in the address register of the first stage.

In this step, an operation of repackaging the address data packet comprises, for example, performing an accumulation operation or a degressive operation on the address of that stage, to obtain the address of the subsequent stage (for example, an increment of the accumulation operation or a decrement of the degressive operation being 1 or any natural number), and repackaging the preamble field and the address data of the subsequent stage in the address data packet into a new address data packet for being transmitted to the subsequent stage.

In step S53, each LED driver circuit of a subsequent stage receives the address data packet from the LED driver circuit of a corresponding previous stage, processes the address data packet, acquires the address of its current stage, and repackages and relays the address data packet.

In this step, an operation of repackaging the address data packet is same as the operation of repackaging in step S53 and is not going to be repeatedly described in detail here.

In this embodiment, each stage of the LED driver circuits intercepts data of a fixed time period from the received address data packet to obtain the address of that stage. Further, each stage of the LED driver circuit stores the address of that stage in an address register of that stage.

In step S54, the controller 110 transmits the configuration data packet of the plurality of LED driver circuits to the second data channel PD and sets the first data channel SD to idle state.

Figure 17B:
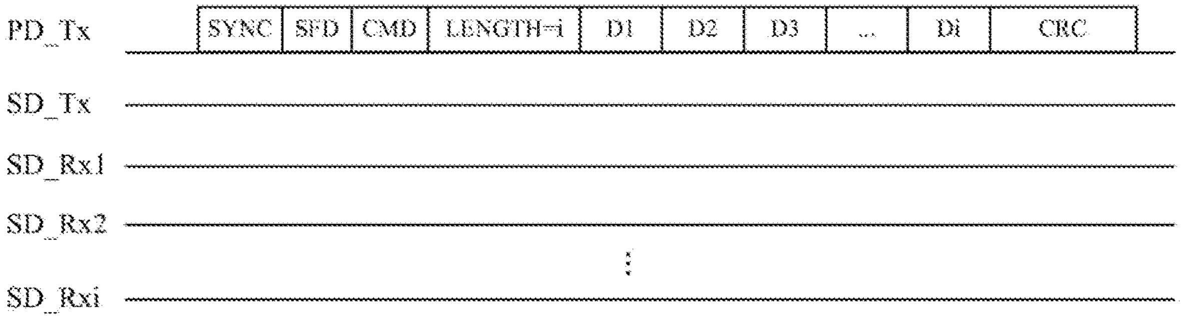

Referring to FIG. 17*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S55, each stage of the LED driver circuits receives the configuration data packet from the second data channel, processes the received configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S54 to S55 to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the first data channel address data is used for relaying address data stage by stage, and the second data channel is used for transmitting configuration data in parallel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packets on the second data channel based on the address of that stage, to obtain the configuration data of that stage.

The method comprises an additional step for performing address allocation on the LED driver circuits, each of which is provided with a hardware module for storing address. The method utilizes the first data channel to transmit the address data for dynamic address allocation, thus allowing any number of LED driver circuits being connected in cascade. The method utilizes the second data channel to transmit the configuration data and the display data, thus increasing data rate.

Figure 18:
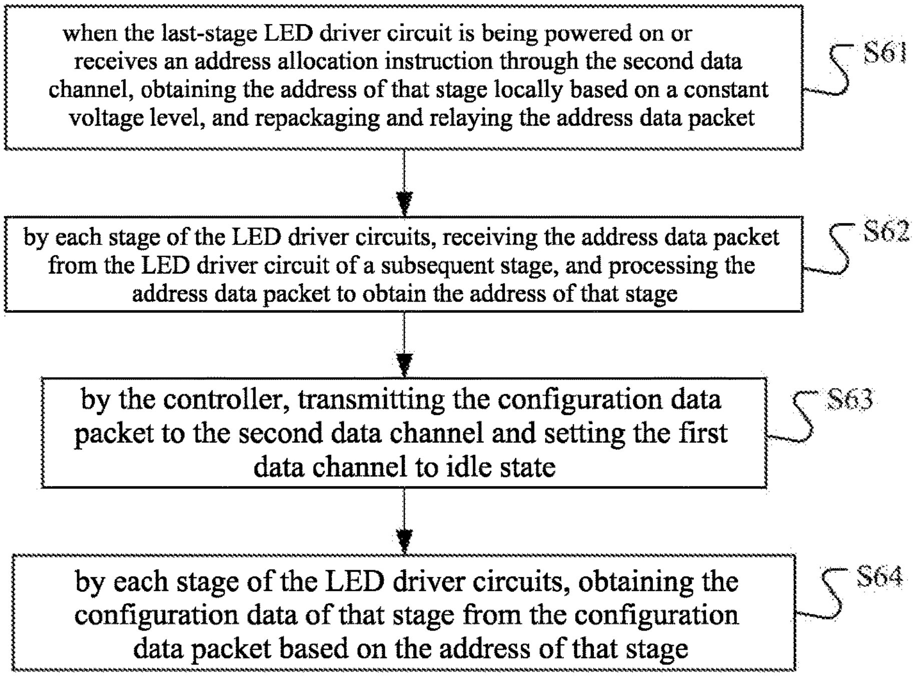
FIG. 18 shows a flowchart of a multi-wire communication method according to a twelfth embodiment of the present disclosure.

FIG. 18 shows a flowchart of a multi-wire communication method according to a twelfth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is only applied to the multi-wire communication device as shown in FIG. 3, and main steps of the multi-wire communication method are described below with reference to the multi-wire communication device as shown in FIG. 3.

Specifically, under the configuration mode of the LED driver circuits, the multi-wire communication device 11 executes steps S61 to S62 in the address allocation phase, and steps S63 to S64 in the configuration data transmission phase.

Figure 19A:
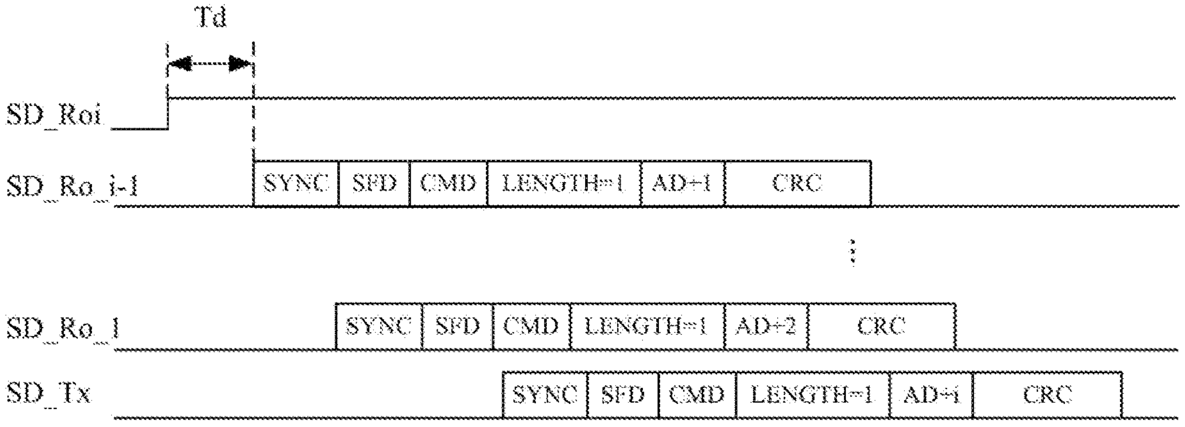
FIGS. 19*a* and 19*b* show waveform diagrams of the multi-wire communication method according to the twelfth embodiment of the present disclosure in an address allocation phase and a configuration data transmission phase.

In step S61, see FIG. 19*a*, in a last-stage LED driver circuit 120-*i*, if it is detected that a signal (i.e., port signal SD_Roi) at the second circuit data port SDO maintains at high voltage level for a certain time Td during chip power-on, the address of the last stage is actively generated locally, or, when an address allocation instruction is received through the second data channel PD, if it is detected that the signal at the second circuit data port SDO maintains at a constant voltage level state within a certain time Td, the address of the last stage is actively generated locally and is set to be stored with a predetermined value (for example, 0 or any natural number), so as to construct the address data packet and send the address packet out through the first circuit data port SDI.

Prior to this step, the first circuit data ports SDI of the LED driver circuits 120-1 to 120-*i* are all in idle state.

In this step, an operation of repackaging the address data packet comprises, for example, performing an accumulation operation or a degressive operation on the address of that stage to obtain an address of a previous stage (for example, an increment of the accumulation operation or a decrement of the degressive operation being 1 or any natural number), and repackaging the preamble field and the address data of the previous stage in the address data packet into a new address data packet for being transmitted to the previous stage.

In step S62, each LED driver circuit of a previous stage receives the address data packet from the LED driver circuit of a correspond subsequent stage, processes the address data packet, acquires the address of its current stage, and repackages and relays the received address data packet.

In this step, an operation of repackaging the address data packet is same as the operation of repackaging in step S61 and is not going to be repeatedly described in detail here.

In this embodiment, each stage of the LED driver circuits intercepts data of a fixed time period from the received address data packet, to obtain the address of that stage. Further, each stage of the LED driver circuits stores the address of that stage in an address register of that stage.

In the present embodiment, the first circuit data port SDI of the first-stage LED driver circuit is connected to the first controller data port SDO of the controller 110 via the first data channel SD. At an end of the address allocation phase of the LED driver circuit of the first-stage, the controller 110 receives the address data packet of the first-stage LED driver circuit, thereby judging that the address allocation is completed, and steps S63 to S64 in the data transmission phase start to be executed.

In step S63, the controller 110 transmits the configuration data packet of the LED driver circuits to the second data channel PD and sets the first data channel SD to idle state.

Figure 19B:
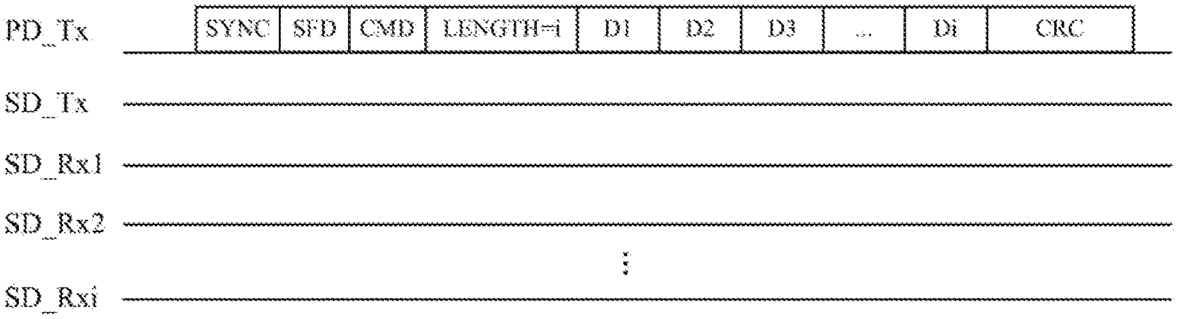

Referring to FIG. 19*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S64, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuit, the multi-wire communication device 11 performs steps similar to the above-described steps S63 to S64 to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by use of the first data channel, and the configuration data is transmitted in parallel by use of the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel to transmit the address data for dynamic address allocation, thus allowing any number of LED driver circuits being connected in cascade. The method utilizes the second data channel to transmit the configuration data and the display data, thus increasing data rate.

Figure 20:
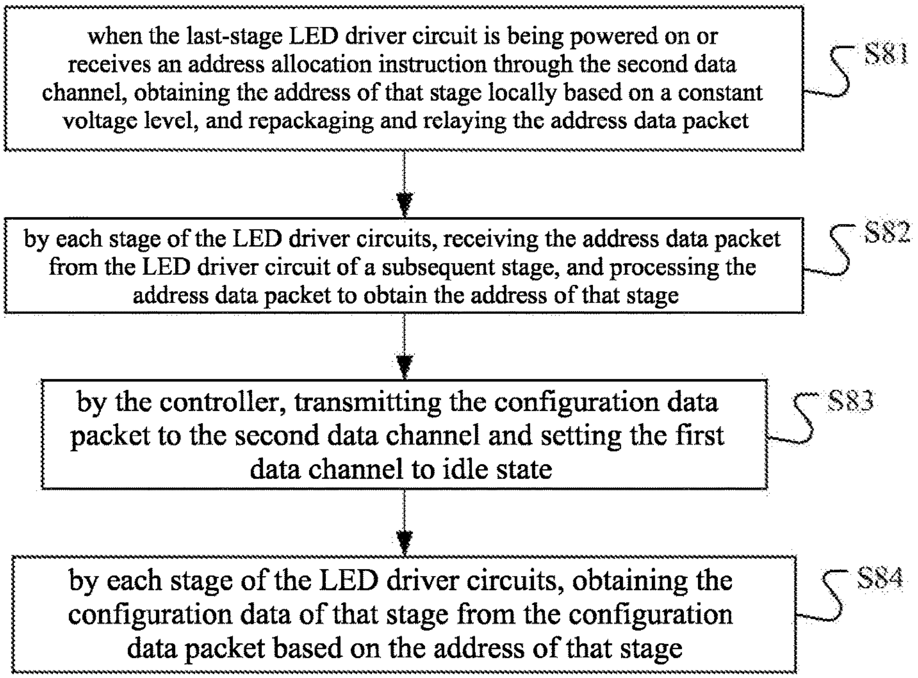
FIG. 20 shows a flowchart of a multi-wire communication method according to a thirteenth embodiment of the present disclosure.

FIG. 20 shows a flowchart of a multi-wire communication method according to a thirteenth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is only applied to the multi-wire communication device as shown in FIG. 4 and main steps of this multi-wire communication method are described below with reference to the multi-wire communication device as shown in FIG. 4.

Specifically, under the configuration mode of the LED driver circuits, the multi-wire communication device 11 executes steps S81 to S82 in the address allocation phase, and steps S83 to S84 in the configuration data transmission phase.

Figure 21A:
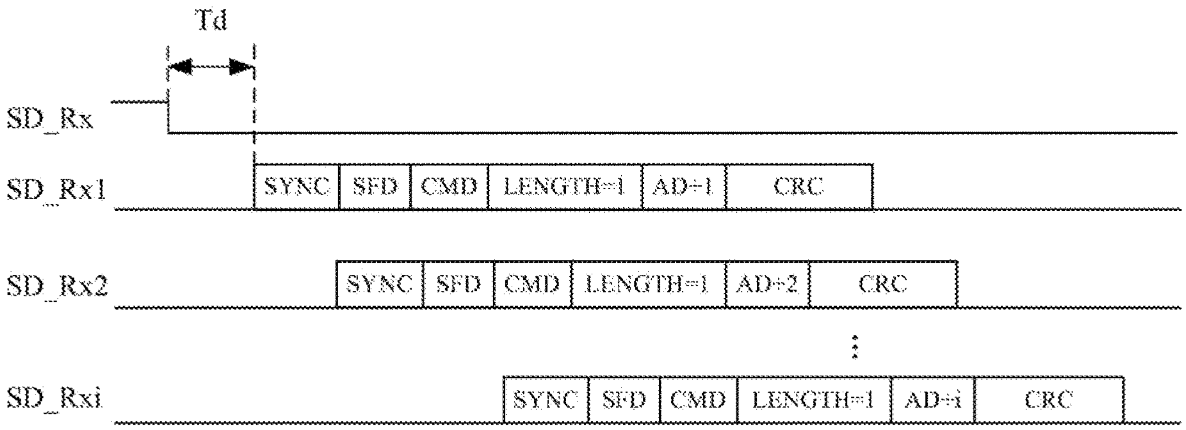
FIGS. 21*a* and 21*b* show waveform diagrams of the multiline communication method according to the thirteenth embodiment of the present disclosure in an address allocation phase and a configuration data transmission phase.

In step S81, see FIG. 21*a*, in a last-stage LED driver circuit 120-*i*, if it is detected that a signal (i.e., port signal SD_Roi) at the second circuit data port SDO maintains at low voltage level for a certain time Td during chip power-on, the address of the last stage is actively generated locally, or when an address allocation instruction is received through the second data channel PD, if it is detected that the signal at the second circuit data port SDO maintains at a constant voltage level state within a certain time Td, the address of the last stage is actively generated locally and is set to be stored with a predetermined value (for example, 0 or any natural number), so as to construct the address data packet and send the address packet out through the first circuit data port SDI.

Prior to this step, the first circuit data ports SDI of the LED driver circuits 120-1 to 120-*i* are all in idle state.

In this step, an operation of repackaging the address data packet comprises, for example, performing an accumulation operation or a degressive operation on the address of that stage to obtain an address of a subsequent stage (for example, an increment of the accumulation operation or a decrement of the degressive operation being 1 or any natural number), and repackaging the preamble field and the address data of the subsequent stage in the address data packet into a new address data packet for being transmitted to the subsequent stage.

In step S82, each LED driver circuit of a subsequent stage receives the address data packet from the LED driver circuit of a corresponding previous stage, processes the address data packet, acquires the address of its current stage, and repackages and relays the address data packet.

In this step, an operation of repackaging the address data packet is same as the operation of repackaging in step S81 and is not going to be repeatedly described in detail here.

In this embodiment, each stage of the LED driver circuits intercepts data of a fixed time period from the received address data packet, to obtain the address of that stage. Further, each stage of the LED driver circuits stores the address of that stage in an address register of that stage.

In the present embodiment, the first circuit data port SDI of the first-stage LED driver circuit is connected to the first controller data port SDO of the controller 110 via the first data channel SD. At an end of the address allocation phase of the first-stage LED driver circuit, the controller 110 receives the address data packet of the first-stage LED driver circuit, thereby judging that the address allocation is completed, and steps S83 to S84 in the data transmission phase start to be executed.

In step S83, the controller 110 transmits the configuration data packet of the LED driver circuits to the second data channel PD and sets the first data channel SD to idle state.

Figure 21B:
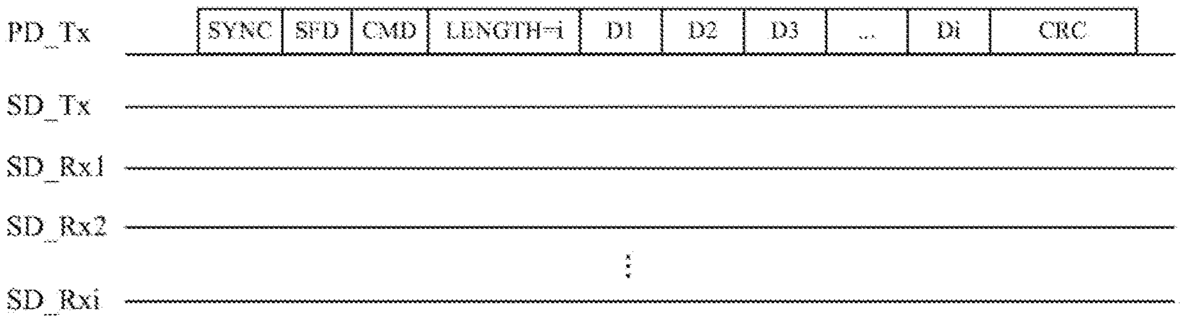

Referring to FIG. 21*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S84, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S83 to S84 to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by use of the first data channel, and the configuration data is transmitted in parallel by use of the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel to transmit the address data for dynamic address allocation, thus allowing any number of LED driver circuits being connected in cascade. The method utilizes the second data channel to transmit the configuration data and the display data, thus increasing data rate.

Figure 22:
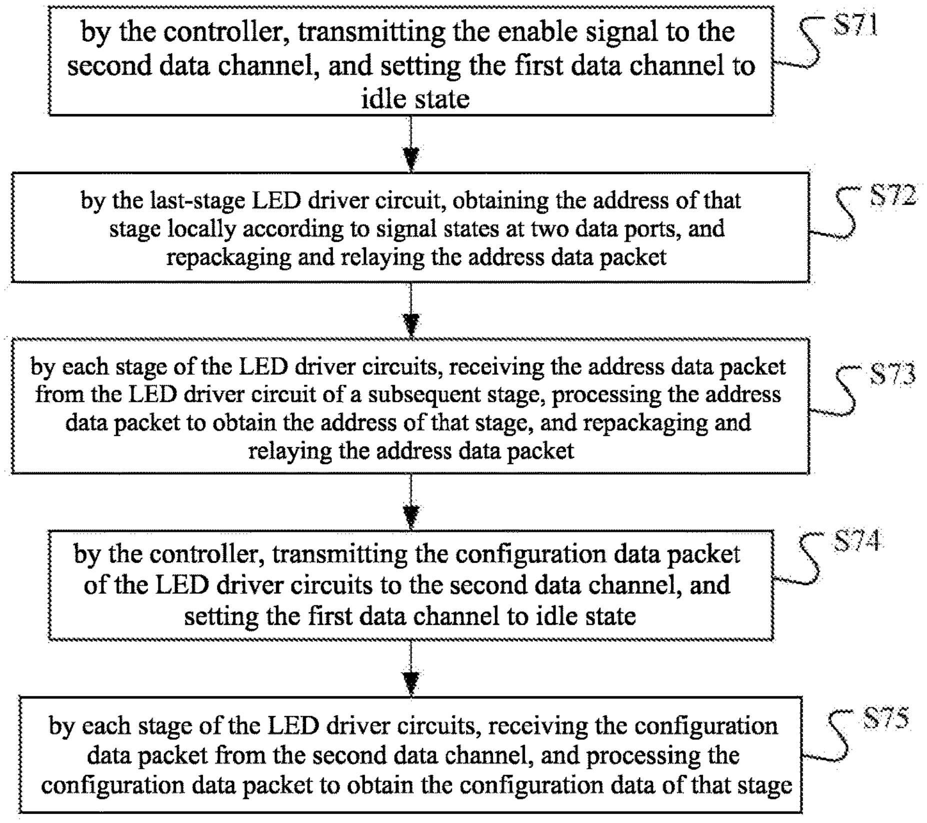
FIG. 22 shows a flowchart of a multi-wire communication method according to a fourteenth embodiment of the present disclosure.

FIG. 22 shows a flowchart of a multi-wire communication method according to a thirteenth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is only applied to the multi-wire communication device as shown in FIG. 5, and main steps of this multi-wire communication method are described below with reference to the multi-wire communication device as shown in FIG. 5.

Specifically, under the configuration mode of the LED driver circuits, the multi-wire communication device 11 executes steps S71 to S73 in the address allocation phase, and steps S74 to S75 in the configuration data transmission phase.

In step S71, the controller 110 transmits an enable signal to the second data channel PD and sets the first data channel SD to idle state.

Figure 23A:
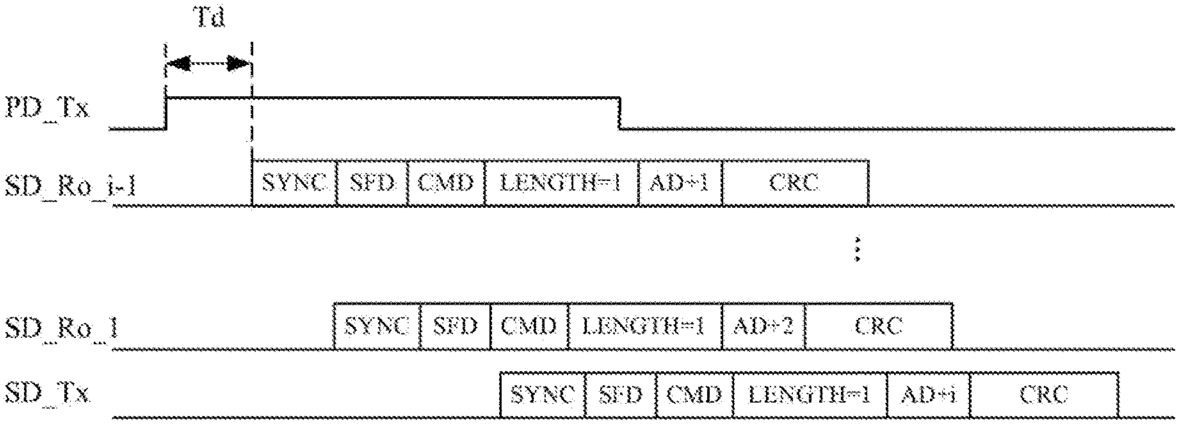
FIGS. 23*a* and 23*b* show waveform diagrams of the multi-wire communication method according to the fourteenth embodiment of the present disclosure in an address allocation phase and a configuration data transmission phase.

In this step, referring to FIG. 23*a*, the second controller data port PDO of the controller 110 transmits the enable signal PD_Tx. The enable signal PD_Tx is, for example, a pulse signal with a valid duration of a predetermined time length, and is, for example, in valid state at high voltage level.

In step S72, a last-stage LED driver circuit locally acquires the address of the last stage according to signal states at the two data ports, and repackages and relays the address data packets.

The second circuit data port SDO and the third circuit data port PDI of the last-stage LED driver circuit are respectively connected to the second data channel PD. In the last-stage LED driver circuit, if it is detected that the enable signal PD_Tx is received at the second circuit data port SDO and the third circuit data port PDI, and valid duration of the enable signal PD_Tx exceeds a predetermined time period Td, the last-stage LED driver circuit can set the address of the last stage as a start address (for example, 0 or any natural number) according to the enable signal PD_Tx, and store the address of the last stage in an address register of the last stage.

In this step, an operation of repackaging the address data packet comprises, for example, performing an accumulation operation or a degressive operation on the address of that stage to obtain an address of a previous stage (for example, an increment of the accumulation operation or a decrement of the degressive operation being 1 or any natural number), and repackaging the preamble field and the address data of the previous stage in the address data packet into a new address data packet of being transmitted to the previous stage.

In step S73, each LED driver circuit of a previous stage receives the address data packet from the LED driver circuit of a corresponding subsequent stage, processes the address data packet, obtains the address of its current stage, and repackages and relays the address data packet.

In this step, an operation of repackaging the address data packet is same as the operation of repackaging in step S72 and is not going to be repeatedly described in detail here.

In this embodiment, each stage of the LED driver circuits intercepts data of a fixed time period from the received address data packet, to obtain the address of that stage. Further, each stage of the LED driver circuits stores the address of that stage in an address register of that stage.

In the present embodiment, the first circuit data port SDI of the first-stage LED driver circuit is connected to the first controller data port SDO of the controller 110 via the first data channel SD. At an end of the address allocation phase of the first-stage LED driver circuit, the controller 110 receives the address data packet of the first-stage LED driver circuit, thereby judging that the address allocation is completed, and steps S74 to S75 in the data transmission phase start to be executed.

In step S74, the controller 110 transmits the configuration data packet of the LED driver circuits to the second data channel PD and sets the first data channel SD to idle state.

Figure 23B:
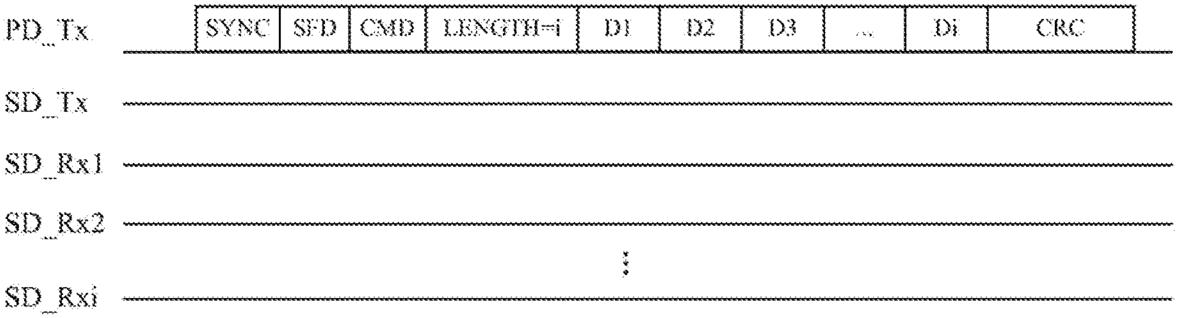

Referring to FIG. 23*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S75, each stage of the LED driver circuits receives the configuration data packet from the second data channel, processes the configuration data packet and obtains the configuration data of that stage.

In this step, each stage of LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of the LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S74 to S75 to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by use of the first data channel, and the configuration data is transmitted in parallel by use of the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel and the second data channel to transmit address data for dynamic address allocation, thus allowing any number of LED driver circuits being connected in cascade. The method utilizes the second data channel to transmit the configuration data and the display data, thus increasing data rate.

Figure 24:
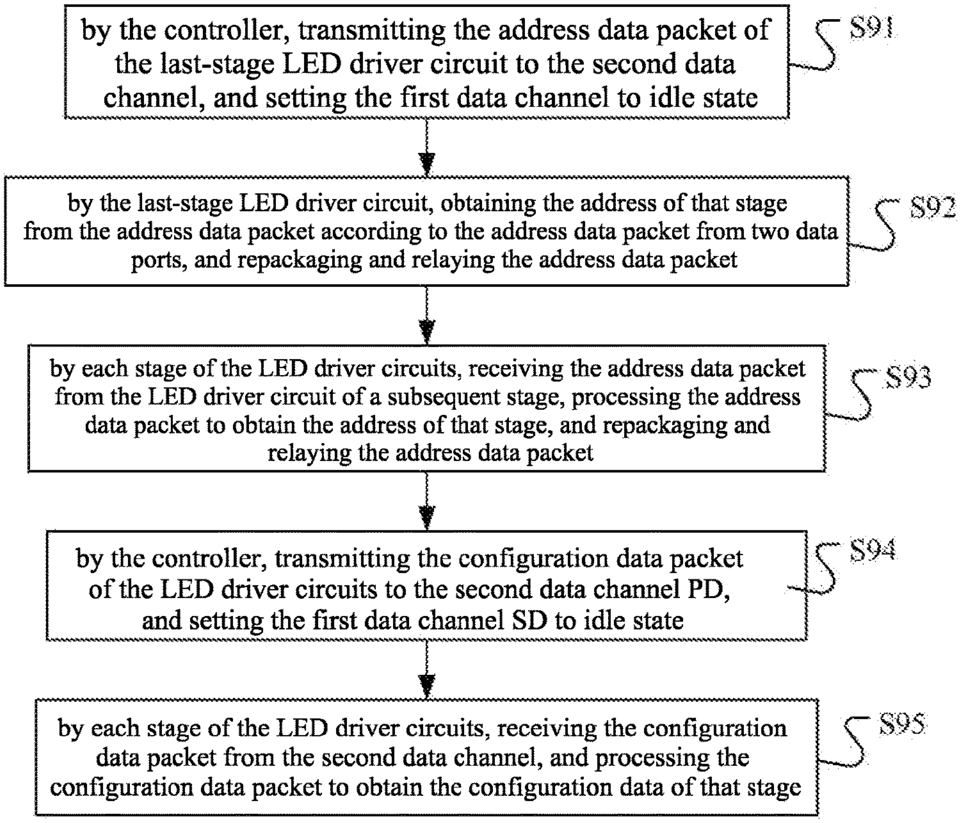
FIG. 24 shows a flowchart of a multi-wire communication method according to a fifteenth embodiment of the present disclosure.

FIG. 24 shows a flowchart of a multi-wire communication method according to a fifteenth embodiment of the present disclosure. The method comprises an address allocation phase and a configuration data transmission phase, which are executed continuously. Based on an address of a current stage, data of a corresponding address is intercepted from the configuration data packet on the second data channel, to obtain the configuration data of the current stage. This method is only applied to the multi-wire communication device as shown in FIG. 5, and main steps of this multi-wire communication method are described below with reference to the multi-wire communication device as shown in FIG. 5.

Specifically, under the configuration mode of the LED driver circuits, the multi-wire communication device 11 executes steps S91 to S93 in the address allocation phase, and steps S94 to S95 in the configuration data transmission phase.

In step S91, the controller 110 transmits the address data packet of a last-stage LED driver circuit to the second data channel PD and sets the first data channel SD to idle state.

Figure 25A:
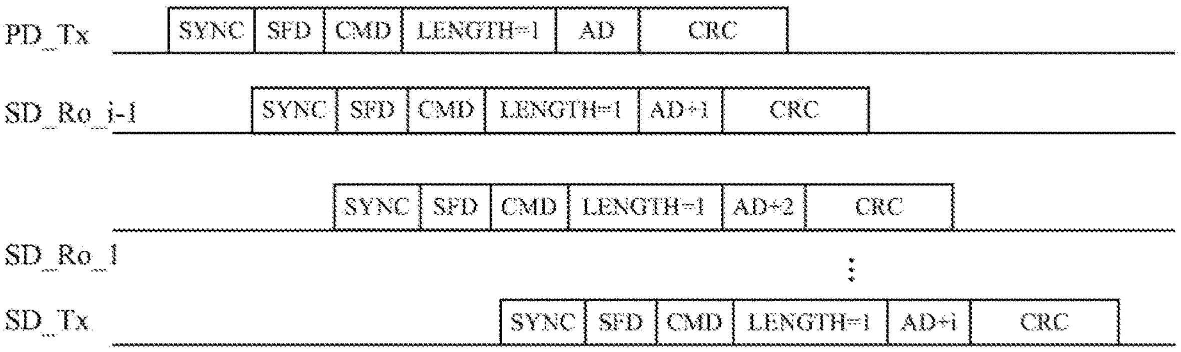
FIGS. 25*a* and 25*b* show waveform diagrams of the multi-wire communication method according to the fifteenth embodiment of the present disclosure in an address allocation phase and a configuration data transmission phase.

In this step referring to FIG. 25*a*, the second controller data port PDO of the controller 110 transmits the address data packet PD_Tx. The address data packet PD_Tx comprises a preamble field, a payload and a frame checksum CRC. The preamble field includes a synchronization identifier SYNC, a start frame delimiter SFD, a command CMD, a data length LENGTH and a payload address data AD.

In step S92, the last-stage LED driver circuit acquires the address of the last stage from the address data packet according to the address data packet received at the two data ports, and repackages and relays the address data packet.

The second circuit data port SDO and the third circuit data port PDI of the last-stage LED driver circuit are respectively connected to the second data channel PD. When the last-stage LED driver circuit detects that the address data packet PD_Tx is received at the second circuit data port SDO and the third circuit data port PDI, the last-stage LED driver circuit obtains the address of the last stage from the address data packet or stores and fixes the address of the last stage as a start address into the address register of the last stage.

In this step, an operation of repackaging of the address data packet comprises, for example, performing an accumulation operation or a degressive operation on the address of that stage to obtain an address of a previous stage (for example, an increment of the accumulation operation or a decrement of the degressive operation being 1 or any natural number), and repackaging the preamble field and the address data of the previous stage in the address data packet into a new address data packet of being transmitted to the previous stage.

In step S93, each LED driver circuit of a previous stage receives the address data packet from the LED driver circuit of a corresponding subsequent stage, processes the address data packet, obtains the address of its current stage, and repackages and relays the address data packet.

In this step, an operation of repackaging the address data packet is same as the operation of repackaging in step S92 and is not going to be repeatedly described in detail here.

In this embodiment, each stage of the LED driver circuits intercepts data of a fixed time period from the received address data packet, to obtain the address of that stage. Further, each stage of the LED driver circuits stores the address of that stage in an address register of that stage.

In the present embodiment, the first circuit data port SDI of the first-stage LED driver circuit is connected to the first controller data port SDO of the controller 110 via the first data channel SD. At an end of the address allocation phase of the first-stage LED driver circuit, the controller 110 receives the address data packet of the first-stage LED driver circuit, thereby judging that the address allocation is completed, and steps S94 to S95 in the data transmission phase start to be executed.

In step S94, the controller 110 transmits the configuration data packet of the LED driver circuits to the second data channel PD and sets the first data channel SD to idle state.

Figure 25B:
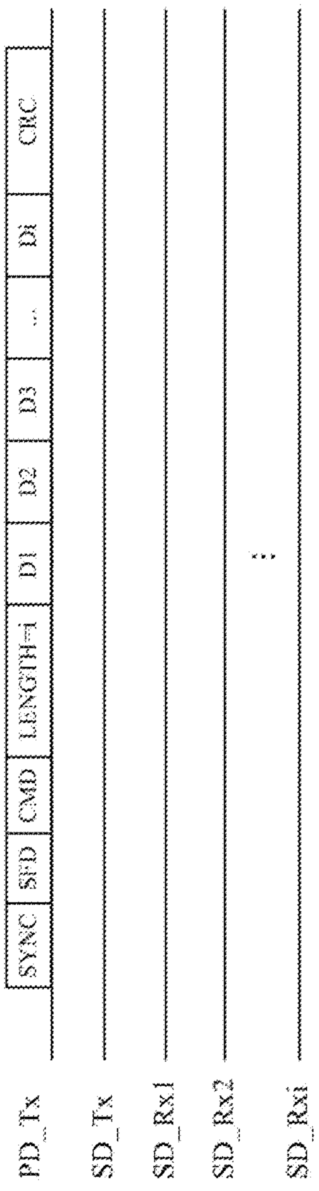

Referring to FIG. 25*b*, the second controller data port PDO of the controller 110 transmits the configuration data packet PD_Tx comprising a preamble field, a payload and a frame checksum CRC. The preamble field includes a synchronization identifier SYNC, a start frame delimiter SFD, a command CMD, a data length LENGTH, and payload configuration data D1 to Di.

In step S95, each stage of the LED driver circuits receives the configuration data packet from the second data channel, processes the configuration data packet and obtains the configuration data of that stage.

In this step, each stage of the LED driver circuits acquires at least one type of data in the preamble field from the configuration data packet. For example, a recovery clock signal can be provided by use of the synchronization identifier SYNC in the preamble field, and a start position of payload can be determined by use of the start frame delimiter SFD. Therefore, even if the plurality of LED driver circuits are not connected to each other by use of a common clock line, synchronous data processing can be realized by use of synchronous data in the preamble field. Each stage of LED driver circuits intercepts the configuration data of a corresponding address from the configuration data packet according to the address of that stage, and stores the configuration data in a configuration register of that stage.

Further, under the display mode of the LED driver circuits, the multi-wire communication device 11 performs steps similar to the above-described steps S94 to S95 to transmit brightness data via the second data channel, for realizing brightness adjustment on the backlight module.

In the multi-wire communication device of the present embodiment, the first circuit data ports SDI and the second circuit data ports SDO of the LED driver circuits are connected in cascade to provide the first data channel, and the third circuit data ports PDI of the LED driver circuits are connected in parallel with each other to provide the second data channel. In the multi-wire communication method of this embodiment, the address data is relayed stage by stage by use of the first data channel, and the configuration data is transmitted in parallel by use of the second data channel. After the address data is relayed to all of the LED driver circuits, each stage of the LED driver circuits can obtain the address data corresponding to that stage of the LED driver circuits. Further, each stage of the LED driver circuits intercepts data of the corresponding address from the configuration data packet on the second data channel based on the address of that stage, to obtain the configuration data of that stage.

The method comprises an additional step for performing address allocation on the LED driver circuits, each of which is provided with a hardware module for storing address. The method utilizes the first data channel and the second data channel to transmit the address data for dynamic address allocation, thus allowing any number of LED driver circuits being connected in cascade. The method utilizes the second data channel to transmit the configuration data and the display data, thus increasing data rate.

According to the multi-wire communication device and the multi-wire communication method of the above embodiments, the first data channel is used to relay the enable signal or the address data stage by stage, and the second data channel is used to transmit the configuration data packet in parallel.

A relaying direction of the first data channel is, for example, a forward direction (e.g., as shown in FIGS. 3 to 5), that is, from the first-stage LED driver circuit to the last-stage LED driver circuit, or a reverse direction (e.g., as shown in FIGS. 3 to 5), that is, from the last-stage LED driver circuit to the first-stage LED driver circuit.

A trigger signal of the first data channel is, for example, the enable signal sent by the controller (e.g., as shown in FIG. 3), or the address data sent by the controller (e.g., as shown in FIG. 5), or a chip power-on signal (e.g., as shown in FIGS. 3 and 4). In a case where the chip power-on signal is used as the trigger signal, for example, the second circuit data port SDO of the last-stage LED driver circuit is connected to one of the power supply terminal and the ground terminal, thereby selecting the last-stage LED driver circuit as the LED driver circuit to be the first one to be allocated with an address in the first data channel.

A relaying content of the first data channel is, for example, the enable signal generated by a corresponding LED driver circuit (as shown in FIGS. 3-5) or the address data which is repackaged by the corresponding LED driver circuit (as shown in FIGS. 3-5). In a case that the corresponding LED driver circuit generates the address data packet by repackaging, for example, the address of the LED driver circuit of the current stage is removed from the address data packet provided by the controller, so as to generate the address data packet for the LED driver circuit of a subsequent stage, or the address of the LED driver circuit of the current stage is accumulated or subtracted, so as to obtain the address data packet for the LED driver circuit of the subsequent stage.

Further, each stage of the LED driver circuits intercepts data of a corresponding address from the configuration data packet according to the enable signal or the address of that stage, to obtain the configuration data of that stage.

Further, each stage of the LED driver circuits intercepts data of a corresponding address from the brightness data packet according to the enable signal or the address of that stage, to obtain the brightness data of that stage.

Further, each stage of the LED driver circuits intercepts data of a corresponding address from the read-back instruction packet to obtain a read-back control instruction of that stage according to the enable signal or the address of that stage, and executes the instruction to obtain a state data of that stage.

Further, the LED driver circuits package and relay the state data stage by stage, and return a corresponding state data packet to the first controller data port SDO of the controller via the first data channel. Alternatively, each stage of the LED driver circuits packages the state data and returns a corresponding state data packet to the second controller data port PDO of the controller via the second data channel according to the time-sharing multiplexing mechanism.

The foregoing is merely a preferred embodiment of the present invention and is not intended to limit the present invention which may be subject to various modifications and variations to those skilled in the art. Any modification, equivalent replacement, improvement, etc. made within the spirit and principles of the present invention should be included in the scope of protection of the present invention.

What is claimed is:

1. A multi-wire communication device for an LED display system, wherein the multi-wire communication device comprises:

a controller, configured to provide at least one of a configuration data packet, a brightness data packet, and a display data packet; and a plurality of LED driver circuits, each of which comprises a first circuit data port, a second circuit data port, and a third circuit data port, wherein, by use of the first circuit data port and the second circuit data port of each of the plurality of LED driver circuits, the plurality of LED driver circuits are cascaded to provide a first data channel, and by use of the third circuit data port of each of the plurality of LED driver circuits, the plurality of LED driver circuits are connected in parallel to provide a second data channel, the multi-wire communication device is configured to relay an enable signal by use of the first data channel, and transmit at least one of the configuration data packet, the brightness data packet, and the display data packet in parallel by use of the second data channel, wherein a synchronization identifier is included in a preamble field of the configuration data packet which is transmitted through the second data channel to each one of the plurality of LED driver circuits parallelly, and wherein for each stage of the plurality of LED driver circuits, the enable signal for that stage is directly received at the first circuit data port of that stage, and the enable signal in a valid state that is configured to enable that stage of the plurality of LED driver circuits to intercept data from the second data channel, as data of that stage, wherein the enable signal received by a first-stage LED driver circuit of the plurality of LED driver circuits provides a valid duration, which is longer than a valid duration of the enable signal received by each of other stages of the plurality of LED driver circuits and is preset to a time period allowing the first-stage LED driver circuit of the plurality of LED driver circuits to receive the synchronization identifier and corresponding intercepted data from the second data channel.

2. The multi-wire communication device according to claim 1, wherein the controller comprises a first controller data port and a second controller data port, the plurality of LED driver circuits comprise the first-stage LED driver circuit and a last-stage LED driver circuit, and the first circuit data port of the first-stage LED driver circuit is connected to the first controller data port of the controller, and the third circuit data ports of the plurality of LED driver circuits are connected in parallel to the second controller data port of the controller.

3. The multi-wire communication device according to claim 2, wherein the second circuit data port of the last-stage LED driver circuit is connected to a constant voltage level, or to the second controller data port of the controller.

4. The multi-wire communication device according to claim 3, wherein the constant voltage level is a voltage level at a power supply terminal or a ground terminal of the multi-wire communication device.

5. The multi-wire communication device according to claim 2, wherein no clock transmission line is included by at least one of the first data channel and the second data channel.

6. The multi-wire communication device according to claim 2, wherein the plurality of LED driver circuits are configured to initiate address allocation based on a trigger signal comprising at least one of a chip power-on signal, the enable signal transmitted by the controller, and an address data transmitted by the controller.

7. The multi-wire communication device according to claim 2, wherein for each stage of the plurality of LED driver circuits, the enable signal for that stage has a valid duration corresponding to a time period for receiving the intercepted data of that stage, and the second circuit data port of that stage is configured to output the enable signal for a next stage.

8. The multi-wire communication device according to claim 1, wherein each stage of the plurality of LED driver circuits is configured to intercept data of a corresponding address from at least one of the configuration data packet, the brightness data packet, and the display data packet, as data of that stage, according to an address data.

9. The multi-wire communication device according to claim 1, wherein the controller is configured to provide a read-back instruction packet via one of the first data channel and the second data channel, each stage of the plurality of LED driver circuits is configured to intercept corresponding data from the read-back instruction packet to obtain a read-back control instruction of that stage according to the enable signal or an address data, and execute the read-back control instruction to obtain a state data of that stage.

10. The multi-wire communication device according to claim 9, wherein the plurality of LED driver circuits are configured to package and relay the state data stage by stage, and return a state data packet to the first controller data port of the controller via the first data channel.

11. The multi-wire communication device according to claim 9, wherein each stage of the plurality of LED driver circuits is configured to package a state data packet of that stage, and transmit the state data packet of that stage back to the second controller data port of the controller via the second data channel according to a time-sharing multiplexing mechanism.

12. The multi-wire communication device according to claim 1, wherein the LED display system comprises any one of a liquid crystal display screen with backlight emitted by an LED and an LED display screen with the LED serving as a pixel unit.

13. The multi-wire communication device according to claim 1, wherein each of the plurality of LED driver circuits further comprises:

a plurality of current driving terminals, connected with a plurality of LEDs to provide driving currents, respectively.

14. A multi-wire communication device for an LED display system, wherein the multi-wire communication device comprises:

a controller, configured to provide at least one of a configuration data packet, a brightness data packet, and a display data packet; and a plurality of LED driver circuits, each of which comprises a first circuit data port, a second circuit data port, and a third circuit data port, wherein, by use of the first circuit data ports and the second circuit data ports of the plurality of LED driver circuits, the plurality of LED driver circuits are cascaded to provide a first data channel, and by use of the third circuit data ports of the plurality of LED driver circuits, the plurality of LED driver circuits are connected in parallel to provide a second data channel, the multi-wire communication device is configured to relay an address data packet by use of the first data channel, and transmit at least one of the configuration data packet, the brightness data packet, and the display data packet in parallel by use of the second data channel, wherein a synchronization identifier is included in a preamble field of the configuration data packet which is transmitted through the second data channel to each one of the plurality of LED driver circuits parallelly, and the synchronization identifier is also included in a preamble field of the address data packet for each one of the plurality of LED driver circuits and is relayed through the first data channel.

15. The multi-wire communication device according to claim 14, wherein a content relayed via the first data channel comprises the address data packet which is repackaged by an LED driver circuit of the plurality of LED driver circuits of a current stage.

16. The multi-wire communication device according to claim 15, wherein, the LED driver circuit of the plurality of LED driver circuits of the current stage is configured to generate the address data packet for the LED driver circuit of the plurality of LED driver circuits of a subsequent stage by removing an address of the LED driver circuit of the plurality of LED driver circuits of the current stage from an address data packet provided by the controller, or to perform an accumulation operation or a degressive operation on the address of the LED driver circuit of the plurality of LED driver circuits of the current stage to obtain the address data packet for the LED driver circuit of the plurality of LED driver circuits of the subsequent stage.

17. The multi-wire communication device according to claim 14, wherein the plurality of LED driver circuits are configured to initiate address allocation based on a trigger signal comprising at least one of a chip power-on signal, an enable signal transmitted by the controller, and an address data transmitted by the controller.

18. The multi-wire communication device according to claim 14, wherein each stage of the plurality of LED driver circuits is configured to intercept data of a corresponding address from at least one of the configuration data packet, the brightness data packet, and the display data packet, as data of that stage, according to an address data.

* * * * *